US006956815B2

(12) United States Patent
Chiodini

(10) Patent No.: US 6,956,815 B2
(45) Date of Patent: Oct. 18, 2005

(54) METHOD AND APPARATUS USING PSEUDO-INVERSES OF LINEAR TRANSFORMATIONS IN MULTI-CARRIER MODULATION RECEIVERS AND TRANSCEIVERS

(75) Inventor: Alain Chiodini, Mountain View, CA (US)

(73) Assignee: Proxim Corporation, San Jose, CA (US)

( * ) Notice: Subject to any disclaimer, the term of this patent is extended or adjusted under 35 U.S.C. 154(b) by 954 days.

(21) Appl. No.: 09/932,734

(22) Filed: Aug. 16, 2001

(65) Prior Publication Data

US 2003/0039205 A1 Feb. 27, 2003

(51) Int. Cl.⁷ .......................... H04J 11/00; H04B 1/173
(52) U.S. Cl. ...................... 370/210; 370/209; 370/342; 370/480; 375/261; 375/341
(58) Field of Search ................................. 370/203, 206, 370/208, 209, 210, 342, 464, 480, 535; 375/261, 295, 316, 341, 346

(56) References Cited

U.S. PATENT DOCUMENTS 5,729,570 A * 3/1998 Magill .......................... 375/149
6,356,555 B1 * 3/2002 Rakib et al. ................. 370/441

* cited by examiner

Primary Examiner—Afsar Qureshi
(74) Attorney, Agent, or Firm—Thelen Reid & Priest LLP

(57) ABSTRACT

Many communications protocols involve a collection of communication channels collectively forming the dimensions of a finite dimensional vector space, of which at any point in time, only a subset of those channels or dimensions must be received. Messages on these channels are time progressions in at least the actively used dimensions of the vector space which have been linearly transformed to create a sample list transported across at least one physical transport layer to a receiver. The linear transform may further include an estimation of the effects of the transport of the sample list across the one or more physical layers to the receiver. This invention uses at least portions of pseudo-inverses of the linear transform in various ways within receivers and receiver portions of transceivers.

176 Claims, 15 Drawing Sheets

METHOD AND APPARATUS USING PSEUDO-INVERSES OF LINEAR TRANSFORMATIONS IN MULTI-CARRIER MODULATION RECEIVERS AND TRANSCEIVERS

TECHNICAL FIELD

This invention relates to the use of pseudo-inverses and truncated pseudo-inverses of linear transformations to create time progressions received by Multi-Carrier Modulation (MCM) receivers, in particular in Orthogonal Frequency Division Multiplex (OFDM) receivers, including but not limited to, IEEE 802.11 compliant receivers and transceivers, as well as their use to determine availability of service for one or more MCM communications protocols.

BACKGROUND ART

FIG. 1 depicts a prior art receiver of a Multi-Carrier Modulated (MCM) signal. The MCM signal is sensed by antenna element 100 and fed 102 to module 110. Module 110 contains a Low Noise Amplifier (LNA) 114 and possibly some form of switch diagrammatically depicted as 116 which collectively feed 112 down converter 120.

The transmitted frequency may use any of several frequency bands, 900 MHz, 2–2.5 GHz and 5–6 GHz, being commonly used transmission bands.

Down converter 120 generates a down converted version of the sensed signal, which is fed 122 to Variable Gain Amplifier 124, which generates an amplified, converter signal which is fed 126 to Band Pass Filter 130. Band Pass Filter 130 removes undesirable noise components introduced by the down conversion and amplification, generating a filtered intermediate frequency signal 132.

The filtered intermediate frequency signal 132 is coherently split into two coherent intermediate frequency signals 134 and 136. Intermediate frequency signal 134 is presented to mixer 160 and intermediate frequency signal 136 is presented to mixer 170. Local Oscillator (LO) 140 generates a stable reference signal 142 which is split into two coherent reference signals 144 and 146. Reference signal 144 is presented to mixer 160. Reference signal 146 is presented to phase offset 150, which generates a phase offset reference signal 152 which is presented to mixer 170. Phase offset 150 imparts the equivalent of a phase shift of 90 degrees onto phase offset reference signal 152 with respect to reference signal 146.

Mixer 160 uses intermediate frequency signal 134 and reference signal 144 to create a first intermediate frequency component signal 162 in a frequency range compatible with A/D converter 190.

Mixer 170 uses intermediate frequency signal 136 and phase offset reference signal 152 to create a second intermediate frequency component signal 172 in a frequency range compatible with A/D converter 210.

Signals 162 and 172 may include undesirable frequency components requiring further filtering before presentation to A/D converters 190 and 210, respectively, but these filters have not been shown in the interests of clarity.

Often the first and second intermediate frequency component signals 162 and 172 contain signals in a frequency range under 100 MHz, in many cases on the order of 1–20 MHz. The maximum frequency range is often known as the intermediate frequency and determines the band pass frequency range of band pass filter 130.

A/D converters 190 and 210 respectively generate first sample data stream 192 and second sample data stream 212. The sampling rate is usually a multiple of the intermediate frequency, which by the Nyquist theorem is theoretically 2, and often in practice at least 2.5.

The sampled data streams 192 and 212, also known as the I and Q sample streams, are sent to digital processor 250. In many situations, they are merged, buffered 260, then conveyed 262 across a communication network 270, and delivered 272 to processing engine 280.

The sample sizes of the A/D converters vary for specific applications, but may be any of 6, 7, 8, 9, 10, 12 or more bits per sample. These digitized samples are often packed into a computer format of 8, 16, or 32 bits.

Processing engine 280 will often place these merged digitized samples into at least one sample input buffer 300 residing in memory 290. Memory 290 is accessibly coupled 282 to processing engine 280. Based upon these buffered, digitized samples 300, processing engine 280 will often utilize a heuristic mechanism to determine whether the sampled channel sensed by antenna 100, and processed by the above discussed mechanism is active, generating a Clear Channel Assessment (CCA) flag 310.

The prior art has focused upon Clear Channel Assessment based upon classical signal detection theory. Such developments focus Bayesian detection mechanisms, which calculate the probability of successful detection against the probability of false detection. Such mechanisms tend to require long start-up times, preferably capturing at least one start of burst or message header containing a training sequence, allowing timing synchronization between the user and the transmitting communications medium.

A/D converters 190 and 210 usually sample their respective input signals at the same rate, in fact most often sampling those signals using a carefully constructed clocking scheme controlling clocking skew between them.

One or more clocks may control the timing of processing engine 280. One clock may be operating above 100 MHz, and perhaps operating at much higher rates, such as 240 MHz or higher.

Processing engine 280 may transfer the merged data samples from temporary buffer 260 based upon the triggering of an interrupt, in some cases using a Direct Memory Access (DMA) mechanism (not shown). The DMA mechanism may operate across network 270 to transfer the digitized input samples to sample inputs 300 residing in memory 290. Note that memory 290 may include both volatile and non-volatile memory components.

One or more program counters may control the operations of processing engine 280. Processing engine 280 fetches one instruction for each of the program counters to control the operations of processing engine 280. Note that a single program counter would be compatible with a Single Instruction processing engine, whereas multiple program counters would be compatible with a Multiple Instruction processing engine.

Alternatively, the operation of processing engine 280 may be controlled by a collection of states, such as the one-hot state machines often found in FPGA-based designs. As used herein, a program step will refer to at least an instruction or processor control state providing the controls necessary to execute one or more steps of the inventive method. A program system as used herein will refer to the collection of program steps implementing an embodiment of the inventive method.

Inverse linear transform 340, as found in the prior art, approximates the inverse of a non-singular linear transform which was used to create a signal progression. That signal progression transports across the physical transport layer(s) of the communication protocol to create the transported version of the signal progression received as the sample list in buffer 260 and subsequently found in sample inputs 300.

As used herein, MCM refers to the communication of a data stream by dividing that data stream into multiple parallel sub-streams, each having a lower bit rate, and then concurrently modulating these sub-streams with separate sub-carriers. The separate carriers may or may not be isolated from each other. Frequency Division Multiple Access (FDMA) protocols, including AMPS and GSM, use frequency bins separated by guard bands as the sub-carriers as in FIG. 2A. Such MCM protocols require steep bandpass filters that completely separate the sub-carriers.

Orthogonal Frequency Division Multiplexing (OFDM) uses densely spaced sub-carriers and overlapping spectra as shown in FIG. 2B, eliminating the need for steep bandpass filters. OFDM sub-carriers are, by construction, mutually orthogonal within the protocol specified sampling window. In many cases, both the transmitter and receiver employ complementary Fast Fourier Transforms (FFT) and Inverse Fast Fourier Transforms (IFFT) to transmit and receive the data sub-streams.

OFDM has been studied for use, in conjunction with Direct Sequence Spread Spectrum techniques, to create CDMA-OFDM protocols as shown in FIG. 2C. The transmitter would first apply a Walsh-Hadamard transform to the multiple data sub-streams to create multiple spread data sub-streams. The multiple spread data sub-streams would then be transformed by an IFFT to create an intermediate frequency modulated signal, which is then up-converted to the transmission frequency band.

The receiver would down convert 120 (and filter 130) the amplified antenna reception 112 to create a received intermediate frequency 132 as discussed in FIG. 1 above. This received intermediate frequency signal 132 would be split (143 and 136) and mixed (160 and 170, respectively) with a local reference 144 and a phase offset version of the reference 152, which would be sampled by A/D converters 190 and 210, respectively. The output of A/D converters 190 and 210 are the I and Q sample streams as discussed above.

OFDM protocol research has lead to the specification and deployment of communications protocols in a variety of application areas including, but not limited to, Digital Video Broadcast, Digital Audio Broadcast, and wireless data networks.

The following formulae provide a first of two equivalent definitions of Walsh-Hadamard transforms as used in spread spectrum communications.

$$H_1 = [0] \tag{1}$$

$$H_2 = \begin{bmatrix} 0 & 0 \\ 0 & 1 \end{bmatrix} = \begin{bmatrix} H_1 & H_1 \\ H_1 & \overline{H_1} \end{bmatrix} \tag{2}$$

$$H_4 = \begin{bmatrix} H_2 & H_2 \\ H_2 & \overline{H_2} \end{bmatrix} = \begin{bmatrix} 0 & 0 & 0 & 0 \\ 0 & 1 & 0 & 1 \\ 0 & 0 & 1 & 1 \\ 0 & 1 & 1 & 0 \end{bmatrix} \tag{3}$$

$$H_{2N} = \begin{bmatrix} H_N & H_N \\ H_N & \overline{H_N} \end{bmatrix} \tag{4}$$

The H matrices use an alphabet of two symbols, 0 and 1. In such an alphabet, the complement of 0 is 1 and the complement of 1 is 0. The over bar marks in formulae (2) to (4) refer to taking the component-wise complement of each element of the matrix involved under the bar.

Formula (1) depicts the $H_1$ matrix, which is a 1 by 1 matrix. Formula (2) depicts $H_2$, the 2 by 2 matrix generated as shown from $H_1$. Formula (3) depicts $H_4$, the 4 by 4 matrix generated as shown from $H_2$. Formula (4) depicts $H_{2N}$ the 2N by 2N matrix generated from $H_N$, where N is a power of two.

The following formulae provide a second equivalent definition of Walsh-Hadamard transforms as used in spread spectrum communications.

$$G_1 = [-1] \tag{5}$$

$$G_2 = \begin{bmatrix} -1 & -1 \\ -1 & 1 \end{bmatrix} = \begin{bmatrix} G_1 & G_1 \\ G_1 & \overline{G_1} \end{bmatrix} \tag{6}$$

$$G_4 = \begin{bmatrix} G_2 & G_2 \\ G_2 & \overline{G_2} \end{bmatrix} = \begin{bmatrix} -1 & -1 & -1 & -1 \\ -1 & 1 & -1 & 1 \\ -1 & -1 & 1 & 1 \\ -1 & 1 & 1 & -1 \end{bmatrix} \tag{7}$$

$$G_{2N} = \begin{bmatrix} G_N & G_N \\ G_N & \overline{G_N} \end{bmatrix} \tag{8}$$

Note that various developments of the G matrices may involve a normalization factor, which has not been included. The G matrices use an equivalent alphabet of two symbols, $-1$ and 1, for which the complement of $-1$ is 1 and the complement of 1 is $-1$. The over bar marks in formulae (6) to (8) refer to taking the component-wise complement of each element of the matrix involved under the bar.

Note that the G matrices are more often used in practice, because the absolute value of every entry in the G matrices is the same. The IS-95 communications protocol defines 64 logical channels encoded by $G_{64}$.

The H matrices are often used for pedagogical purposes or as part of a process leading to the G matrices, providing a more accessible relationship with the standard definitions of bits.

As used herein a bit represents an alphabet possessing two symbols. Multiple bits are the concatenation of single bits, preferably representing a single alphabet.

The prior art also includes Discrete Wavelet Transform (DWT) coding, which is a powerful extension of the linear transform coding discussed to this point.

The following formulae define Discrete Wavelet Transforms as found in the prior art.

$$A = \begin{bmatrix} \cdots & a_{-1}^0 & a_0^0 & a_1^0 & a_2^0 & \cdots \\ \cdots & a_{-1}^0 & a_0^1 & a_1^1 & a_2^1 & \cdots \\ \cdots & \cdots & \cdots & \cdots & \cdots & \cdots \\ \cdots & a_{-2}^{m-1} & a_0^{m-1} & a_1^{m-1} & a_2^{m-1} & \cdots \end{bmatrix} \tag{9}$$

$$\sum_{k=-\infty}^{\infty} a_k^s = m\delta^{s,0} \tag{10}$$

$$\sum_{k=-\infty}^{\infty} a_{k+ml}^{s'}, \overline{a_{k+ml}^{s}} = m\delta^{s',s}\delta_{0,1} \tag{11}$$

Where the Kronecker deltas are defined as if s=s', then $\delta^{s,s'}$=1 else $\delta^{s,s'}$=0 if l=l', then $\delta_{l,l'}$=1 else $\delta_{l,l'}$=0

Formula (9) shows a matrix A with m rows and an unlimited number of columns. A is defined as a wavelet matrix of rank m if formulae (10) and (11) are satisfied by the components of A, $a^s_k$. These components usually belong to an algebraic sub-field of the complex numbers, such as rational complex numbers, real numbers, rational real numbers, or the complex numbers themselves. To simplify the discussion, the components of A will be assumed to be complex numbers. The over bar of formula (11) refers to taking the complex conjugate of the expression under that bar.

$$A_l = \begin{bmatrix} a^0_{l*m} & a^0_{l*m+1} & \cdots & a^0_{l*m+m-1} \\ a^1_{l*m} & a^1_{l*m+1} & \cdots & a^1_{l*m+m-1} \\ \cdots & \cdots & \cdots & \cdots \\ a^{m-1}_{l*m} & a^{m-1}_{l*m+1} & \cdots & a^{m-1}_{l*m+m-1} \end{bmatrix} \quad (12)$$

$$A = (\ldots A_{-1} A_0 A_1 \ldots) \quad (13)$$

Formula (12) defines a sub-block matrix $A_l$ of matrix A containing the columns of A from I*m to I*m+m−1. Formula (13) shows a second way of looking at A as an arbitrary long vector with entries $A_l$. Suppose that only finitely many of the $A_l$ components are non-zero. Further suppose that $A_{N1}$ is the first non-zero component and $A_{N2}$ is the last non-zero component. Let g=N2−N1+1.

Formulae (14) and (15) define the Laurent series A(z) for the matrix A defined by formula (9) in two different ways.

$$A(z) \equiv \begin{bmatrix} \sum_{k=-\infty}^{\infty} a^0_{mk} z^k & \cdots & \sum_{k=-\infty}^{\infty} a^0_{mk+m-1} z^k \\ \cdots & \sum_{k=-\infty}^{\infty} a^s_{mk+r} z^k & \cdots \\ \sum_{k=-\infty}^{\infty} a^{m-1}_{mk} z^k & \cdots & \sum_{k=-\infty}^{\infty} a^{m-1}_{mk+m-1} z^k \end{bmatrix} \quad (14)$$

$$A(z) = \sum_{l=-\infty}^{\infty} A_l z^l \quad (15)$$

From hereon, this discussion will assume that only finitely many of the $A_l$ components are non-zero. Such matrices A will be known as discrete wavelet matrices. To further simplify the discussion, from hereon N1 will be taken to be zero. As one of skill in the art will realize that N1 could be non-zero and the resulting matrices would essentially be equivalent to "shifted" matrices where N1=0.

Any DWT is equivalent to a matrix A, which has m rows and m*g columns, where m is called the rank and g is the genus of the transform. Each DWT transform is further characterized by an m*m characteristic Haar matrix which equals A(1). When g is one, the transform has a square matrix equal to its Haar characteristic matrix.

Formula (11) asserts that the rows of a wavelet matrix $a^s = (a^s_0, \ldots, a^s_{mg-1})$ have length $m^{1/2}$ and that they are pair-wise orthogonal when shifted by an arbitrary multiple of m.

The vector $a^0$ is often called the scaling vector, low pass filter, or scaling filter. The vectors $a^s$ for 0<s<m are often called wavelet vectors, high-pass filters, or wavelet filters. Formula (10) states that the sum of the components of the scaling vector is m, whereas for each wavelet vector, the sum of components is zero.

The rank m of a transform corresponds to the sampling rate and to the number of bands in an m-band filter bank implementation. If a filter has rank m, then it samples the signal m times per unit time. When m is infinite, the sampling is continuous and the filter is analog.

The genus g of the transform represents the number of symbols or signaling intervals over which the filter operates. When the rank m is finite, m*g equals the number of taps in each sub band filter. Note that if g is infinite, the filter has infinite duration and is not practicable.

Discussion of the characteristic Haar matrix would entail a digression, which is not central to the invention. Suffice it to say that for a given rank m, the choice of Haar characteristic matrices ranges over a continuous (m−1)^2 dimensional family of matrices.

Increasing the rank of m corresponds to increasing the spectral resolution whereas increasing the genus of a transform corresponds to increasing the overlap of successive transform windows.

Note that Fourier transforms as well as Walsh-Hadamard transforms both can be defined, extended and analyzed by DWT techniques, though this is a topic well outside the range of this invention.

Walsh-Hadamard matrices are a special case of Hadamard matrices. Hadamard matrices are square matrices of rank m containing components whose values are either +1 or −1. Hadamard matrices further satisfy $H^T H = H H^T = mI$. Note that a Hadamard matrix may be an n*n matrix of rank m, where m is less than n.

Consider a linear transform from a domain N dimensional space to a range, which is a second N dimensional space. If the linear transform does not cover the range, in other words, if there is a point in the second N dimensional space for which there is no point in the domain which transforms to that point, then the linear transform is singular. If for every point of the second N dimensional space, there is exactly one corresponding point in the first N dimensional space which transforms to that point, then the transform is non-singular.

Linear transforms are well known to have matrices associated with them. When the linear transform is non-singular, its matrix is non-singular, has non-zero determinant and possesses an inverse, which is also non-singular with non-zero determinant.

When the linear transform is singular, its matrix is singular, has determinant 0 and does not possess a non-singular inverse.

A further problem occurs when a linear transform goes from an N dimensional space to an M dimensional space, where N and M are distinct. Again, there is a matrix associated with the transform, but the transform cannot be non-singular.

Work by a number of people, including Moore, Penrose, and Drazin, has led to a theory of inverses applicable to singular matrices, giving rise to several sometimes distinct, pseudo-inverses of a matrix. As may be expected, the pseudo-inverse of a non-singular (necessarily square) matrix is the classic inverse, which is non-singular.

As used herein, R(A) will refer to the range of the linear transform for the associated matrix A and N(A) will refer to the null space of the linear transform for the associated matrix A. The addition of two vector spaces over the same field (which will usually be C, the complex numbers) is the vector space including exactly all linear combinations of the vectors of the two vector spaces. Note that much of this discussion is applicable to vector spaces over algebraic fields in general and in specific, almost always to algebraic sub-fields of the complex numbers including the rational real numbers, real numbers, and rational complex numbers, as well as the complex numbers. The discussion from hereon will focus on vector spaces over the complex number field for convenience and is not intended to restrict the scope of the claims herein.

The conjugate transpose of a matrix A will be denoted herein as A* and will include components for a given row and column which are complex conjugates of the component of the column and row of A.

Given a matrix A of m rows and n columns of m*n complex number components, a matrix G of n rows and m columns of n*m complex number components is called herein an (i,j,k)-inverse of A if G satisfies the ith, jth and kth Penrose conditions:
1. AGA=A
2. GAG=G
3. (AG)*=AG
4. (GA)*=GA The set of all (l,j,k)-inverses for A will be denoted by A{l,j,k}.

The following are some basic facts about some of the various classes of inverses developed in detail in *Generalized Inverses of Linear Transformations* by S. L. Campbell and C. D. Meyer, Jr., © 1979, first published by Dover in 1991, ISBN 0-486-66693-X, particularly in chapter 6.

G belongs to A{1} if and only if Qb is a solution of Ax=b, for every vector b in the range of A. This type of inverse is denoted (1)-inverse and is called the Equation Solving Inverse.

If G belongs to A{1,2}, then $N(A)+R(G)=C^n$ and $R(A)+N(G)=C^m$. Each (1,2)-inverse defines complementary subspaces for N(A) as well as R(A). Conversely, for each pair of subspaces (P,Q), where P and Q are complementary to N(A) and R(A), respectively, uniquely determine a (1,2)-inverse, $G_{P,Q}$ with $R(G_{P,Q})=P$ and $N(G_{P,Q})=Q$. This type of inverse will be called a prescribed range/null space inverse.

Two vector subspaces of a vector space will be referred to as complementary if the only element they have in common is the origin, and if linear combinations of vectors from these two subspaces cover the whole vector space.

G belongs to A{1,3} if and only if Gb is a least squares solution of Ax=b for every vector b in $C^m$. Gb will be referred to as a least squares solution of Ax=b when the distance between the hyperplane Ax and the vector b is minimal at Gb. This type of inverse will be called a least squares inverse.

G belongs to A{1,4} if and only if Gb is the minimum norm solution of Ax=b for every vector b in R(A). This type of inverse will be called a minimum norm inverse.

As used herein, the norm of a vector b is formed as the square root of the product b and b*. Note that the product of b and b* is a non-negative real number. The minimum norm solution Gb has the least norm of any solution of Ax=b.

A{1,2,3,4} contains exactly one element, denoted as $A^+$ herein. $A^-$ is the (R(A*), N(A*))-inverse for A. $A^+b$ is the minimal norm least squares solution of Ax=b for any b in $C^m$. If b belongs to R(A), then $A^+b$ is the minimal norm solution of Ax=b. $A^+$ is known elsewhere as the Moore-Penrose Inverse.

Computing the Moore-Penrose inverse $A^+$ from the above definitions involves an unpleasant fact. If A is of neither full row rank nor full column rank, then the rank of A may be perturbed in an arbitrarily small way, dramatically changing the value of $A^+$ (see page 247 of Campbell and Meyer for a discussion and proof).

Another approach to calculating the Moore-Penrose inverse $A^+$ involves use of the Singular Value Decomposition Theorem (see pages 6, and 247–262 of Campbell and Meyer). Matrix A is factored into A=UEV, where U and V are unitary (square) matrices and E has the form $E=[Diag(Eigen(A*A)^{1/2})\ 0]$
$[0\ 0]$ The E matrix includes the positive eigenvalues of the matrix of the square roots of A*A.

Defining $A^+=V*E^+U*$, can be shown to provide a well defined pseudo-inverse varying continuously with A regarding suitably chosen matrix norms (pages 247–262 of Campbell and Meyer, matrix norms are defined and discussed on pages 210–213). This definition is often taken as the standard for these reasons.

While much more can be said about this topic, the above definition is computationally demanding. Matrix inverses of non-singular square matrices using Gaussian elimination take on the order of $N^3$ operations. Calculation of all the eigenvalues of a matrix $(A*A)^{1/2}$ is an even greater task. A number of specialized algorithms are discussed in Campbell and Meyer, as well as in other literature sources which are much faster and often useful, but lack the generality of the Singular Value Decomposition derived $A^+$.

Note that the Moore-Penrose inverse, as well as {i,j,k}-inverses, provide either some form of solution, or least-squares solution, for a linear algebraic system. While possessing many important qualities, these inverses lack some other desirable qualities. Let A and B be n*n complex matrices, there is no class C(i,j,k) of {i,j,k}-inverses $A^-$ and $B^-$ for A and B respectively which imply any of the following:
1. $AA^-=A^-A$,
2. $(A^-)^p=(A^p)^-$ for all positive integers p,
3. $\lambda$ is an eigenvalue of A if and only if $1/\lambda$ is an eigenvalue of $A^-$.
4. $A^{p+1}A^-=A^p$, for positive integers p.

The Drazin inverse and group inverse have at least these properties.

Before discussing the Drazin inverse, we need to define the index of linear transformation A from $C^n$ to $C^n$, which will be denoted herein as Ind(A). Ind(A) is the smallest non-negative integer k such that $C^n=R(A^k)+N(A^k)$, where $A^2=A$ applied to A, $A^{m+1}=A$ applied to $A^m$, for any positive integer m. Note that if A is non-singular, Ind(A)=0 and that Ind(O)=1. Further, if k=Ind (A), then $R(A^k)=R(A^{k+1})$.

There are two ways to define the Drazin inverse of a square matrix A associated with linear transformation A from $C^n$ to $C^n$.

Let A be a linear transformation on $C^n$ such that k=Ind(A). Let $A_1$=A restricted to $R(A^k)$. Let x=u+v belong to $C^n$, where u belongs to $R(A^k)$ and v belongs to $N(A^k)$. $A_1$ is invertible and define $A^Dx=A_1^{-1}u$. $A^D$ is the Drazin inverse of linear transformation A. This definition is known as the Functional Definition of the Drazin inverse.

The Algebraic Definition of the Drazin inverse defines $A^D$ in $C^{n*n}$ for A in $C^{n*n}$ with Ind(A)=k as a matrix satisfying the following:

$A^DAA^D=A^D$ $AA^D=A^DA$ and $A^{k+1}A^D=A^k.$

These definitions are equivalent, and for any A in $C^{n*n}$, $A^D$ exists and is unique. If A is non-singular, then $A^D$ is exactly the standard matrix inverse.

Note that $A^D$ is not always a {1}-inverse for A, it doesn't always solve Ax=b. In fact $A^Db$ is a solution of Ax=b if and only if b belongs to $R(A^k)$, where k=Ind(A).

In one important case, when Ind(A)<=1, $A^D$ solves Ax=b. In such cases $A^D$ is called the Group Inverse of A and is often denoted by $A^\#$. When it exists, $A^\#$ can be alternatively defined as the unique matrix satisfying $$AA^\#A=A$$

$$A^\#AA^\#=A^\#$$

$$AA^\#=A^\#A$$

Finally, the relationship between the Moore-Penrose inverse $A^+$ and the Drazin inverse $A^D$ for a matrix A in $C^{n*n}$, $A^+=A^D$ if and only if $A^+A=AA^+$.

Modern radio receivers such as depicted in FIG. 1 often face situations where the active reception channels to be decoded are a subset of all the channels supported by the protocol. Note that these channels are the received version of signals transmitted after being linear transformed by any of a number of matrices. These transform matrices may or may not be square matrices. They may not be invertible, even if they are square matrices.

An example of this is found in the IEEE 802.11a protocol, where there are always 12 null frequency bins, but during the header transmission there are only 12 active data frequency bins out of the 64 frequency bins in the protocol. While only a small part of the frequency bins are required, there is no technique available to describe and control DSP resources at any level finer than a linear transformation. As a consequence, vital computational resources are expended when only a small part of those resources need be used. During the header, only 12 out of the 64 results of the FFT are used. Note that the range of the encoding transformation for the preamble has a dimension of 12 out of 64. The range of the encoding transformation of the body has a dimension of 52 out of 64.

FIG. 2D depicts an example emitted power spectrum requirement for transmitted OFDM signals as found in FIG. 120 of the IEEE 802.11a protocol specification.

"The transmitted spectrum shall have a 0 dBr (dB relative to the maximum spectral density of the signal) bandwidth not exceeding 18 MHz, −20 dBr at 11 MHz frequency offset, −28 dBr at 20 MHz frequency offset and −40 dBr at 30 MHz frequency offset and above. The transmitted spectral density of the transmitted signal shall fall within the spectral mask, as shown in FIG. 120. The measurements shall be made using a 100 kHz resolution bandwidth and a 30 kHz video bandwidth." (17.3.9.2 Transmit spectrum mask page 28 of the IEEE Standard 802.11a-1999 document)

What is needed is a method of specifying the use of DSP resources based upon inverses of these matrices, which may not necessarily be square matrices, and which may be singular matrices even when they are square matrices. What is further needed is a way to determine the type of inverse of these matrices, as well as calculate the matrix inverse type, most useful for the specific radio reception problem.

Additionally, it is desirable for software radios like that shown in FIG. 1 be able to receive communications in multiple communications protocols. These communications protocols may use the same frequency range for dramatically different protocols. An example of this is the use of the AMPs frequency channels by the IS-95 communications protocol.

IS-95 employs a physical transport layer made of either a single or pair of physical channels reusing the AMPs physical channels. An IS-95 physical channel takes up 41 contiguous AMPs physical channels. When a single IS-95 physical channel is implemented, it is surrounded by a guard band of 9 AMPs physical channels on either side in the frequency domain. When dual IS-95 channels are implemented, the pair of IS-95 physical channels are immediately adjacent to each other, with 9 AMPs physical channels on either side of the pair of IS-95 physical channels.

What is needed is a mechanism to specify linear transformations suitable for rapidly reconfiguring reception by the software radio receiver between distinct communications such as AMPs and IS-95, allowing the reception of channels based upon suitable matrix inverses of these diverse linear transformations.

Cellular telephone users regularly complain about coverage limitations in the United States. A given area will often support some of the wireless protocol standards, which may include AMPs, GSM and IS-95, but not all of them. Most cellular telephones today are built around transceivers, which communicate using only one standard. Cellular telephone transceivers need to sense which protocols are actively supported in the area near which the transceiver is operating.

Cellular telephone users who travel internationally face a very similar problem. Again, most cellular telephones respond to only one of the common standards of today, and there are several distinct standards employed in large areas of the world. These cellular telephones are often useless in areas not supporting that one standard for which they are compatible. Cellular telephone transceivers again need to sense which protocols are actively supported in the area near which the transceiver is operating.

SUMMARY OF THE INVENTION

Aspects of the invention address at least each of the above-mentioned needs.

Many communications protocols involve a collection of communication channels collectively forming the dimensions of a finite dimensional vector space, of which, at any point in time, only a subset of those channels or dimensions must be received. The encoding of messages onto these channels is a time progression in the actively used dimensions of the vector space.

Examples of this include the OFDM protocol IEEE 802.11a, where there are always at least 12 of the 64 frequency bins unused in generating the time domain sequence which is transmitted. Another example is the GSM cellular telephone protocol, which uses a limited number of time slots and frequency bins to communicate necessary systems control and timing information to any transceiver in its service area for the initiation of a phone call in the service area of a base station. Similarly, IS-95 reserves certain logical channels, which are dimensions in the Walsh-Hadamard matrix-derived vector space for similar communication of necessary systems control and timing information to user transceivers attempting phone call initiation in the service area of a base station.

The invention utilizes a truncated version of the pseudo-inverse for the actively used portion of the transform to process received sample lists into at least one signal parameter. The actively used portion of the transform may not be all that the external transmitter is sending, but preferably is the actively used portion that the receiver wishes to receive.

The inverse of the actively used portion of the transform is a pseudo-inverse, and the invention may employ distinct forms of pseudo-inverses even for the same communications protocol. The truncated version of the pseudo-inverse may generate a result including at least some of the active channels. The truncated version of the pseudo-inverse may also generate exactly the active, subspace results.

The invention may use a truncated version of the actively used portion of the transform augmented by at least one signal which will be cancelled in the receiver to process received sample lists into at least one signal parameter.

By way of example, let a chirp signal s be added to a data-bearing OFDM time sequence symbol involving the 52 actively used subcarriers. On the transmitter side, the intermediate frequency output will be the product of a matrix M by the sequence of time stimulus vectors X of 53 dimensions, 52 data bearing dimensions and one chirp signal dimension. The matrix MM will contain the 64 by 52 DFT matrix M concatenated with a 64-element chirp vector s. MM=[M s] has the array dimensions of 64 by 53. Note that the chirp signal s is required to comply with any communications protocol requirements such as emitted power spectrum constraints.

On the receiver side, compute N as the pseudo-inverse of MM, having array dimensions of 53 rows by 64 columns. Let NT be the matrix formed by truncating the row associated with s in N, which in this example is the last row. Estimate X=NT*[Received Samples].

Certain preferred embodiments of the invention support the reception of OFDM signals compliant with the IEEE 802.11a standard by processing a received sample list using a truncated pseudo-inverse of the trimmed matrix associated with the 64 point FFT (and/or DFT). It is further preferable to use at least two truncated pseudo-inverses of the trimmed square matrix, i.e. rectangular matrix associated with a trimmed FFT and/or DFT, the first excludes 12 null channel-frequency bins and the second excludes 52 null channel-frequency bins. The first is used during the data portion of a transmission and the second is used during reception of a transmission header.

Note that by knowing what signal is being cancelled, NT can be pre-computed and stored. In the case of data-bearing IEEE 802.11a OFDM signals, up to 64−52=12 signals may be actively cancelled.

Additionally, when an IEEE 802.11a receiver wakes up after quiescence, it is preferable to use a third truncated pseudo-inverse of the FFT generating a minimal number of frequency bin samples. These frequency bin samples are then used to calculate a first energy estimate and a second energy estimate for the purposes of determining the CCA_flag. The CCA_flag is set to busy whenever the first energy estimate exceeds the second energy estimate multiplied by a threshold. Note that at least some of the minimal frequency bin samples may in effect integrate more than one of the frequency bins specified by the standard.

Certain preferred embodiments of the invention include receivers, therefore transceivers, capable of supporting at least two communications protocols in wireless communications applications including cellular telephones and personal digital assistants. When such receivers wake up from quiescence, they process at least one sample list received from an electromagnetic transponder using a truncated pseudo-inverse allowing them to determine whether there is service support for at least one of the supported protocols of the receiver.

It is preferable that if two communications protocols share the same frequency window, as in the case of AMPs and IS-95, that the truncated pseudo-inverse contains a third truncated pseudo-inverse and a fourth truncated pseudo-inverse. Preferably, the result of applying third and fourth truncated pseudo-inverses aids in determining whether there is service support for the first wireless protocol and second wireless protocol sharing the frequency window, respectively. This minimizes latency in determining which communications protocols are locally supported.

If two communications protocols supported by the receiver/transceiver have separated enough frequency bands requiring separate down-conversions, then it is preferable in certain embodiments of the invention that separate sample lists be received for each protocol. These separate sample lists may be further processed using at least partially differing truncated pseudo-inverses to determine the availability of service for the different protocols.

The receiver is coupled to at least one electromagnetic receptor, receiving a sample list of at least two digitized samples based upon the electromagnetic receptor. Often these digitized samples are generated as the output of at least one A/D converter. The electromagnetic receptor may include at least one antenna element, and receiving the sample list may be derived from an electromagnetic field proximate to the antenna element. The electromagnetic receptor may include at least one semiconductor element, and receiving the sample list may be derived from an electromagnetic field based upon the bulk transport properties of the semiconductor receptor element.

The receiver may be coupled to multiple electromagnetic receptors. In such cases, receiving the sample list may preferably include receiving the sample list from at least two of the electromagnetic sensors. Examples of such embodiments include transceivers coupled to multiple directional antennas.

Similarly, base station receivers must find each transmitting user's signal against the perpetual reception of many forms of background noise. Base stations may know where in a first vector space of reception to look for a user's signal, which may include but is not limited to, frequency slots, TDMA time-frequency slots, and spread spectrum time-aligned spreading sequences.

There is a second vector space, a base station or other receiver must contend with, regarding the relative location of a transmitter. Often such receivers are coupled to multiple antenna elements and/or electromagnetic receptors, providing sensor streams from multiple overlapping reception lobes. The propagation effects from a transmitter to and/or from these antenna elements and/or electromagnetic receptors can be modeled as a linear transform of the time progression of encoded signals at the transmitter derived from the lobe plot of the radio network. These linear transforms are almost never singular.

What is needed is a mechanism for processing the received sample lists from multiple electromagnetic receptors and/or multiple antenna elements within at least one electromagnetic receptor to improve either location resolution for receiving a transmitted signal and/or improve the signal to noise ratio for such a received signal.

These and other advantages of the present invention will become apparent upon reading the following detailed descriptions and studying the various figures of the drawings.

BRIEF DESCRIPTION OF THE DRAWINGS

FIG. 10B depicts a detail flowchart of program system 1000 of FIG. 3 determining of a Clear Channel Access for a CSMA protocol such as IEEE 802.11a.

DETAILED DESCRIPTION OF THE INVENTION

Figure 1:
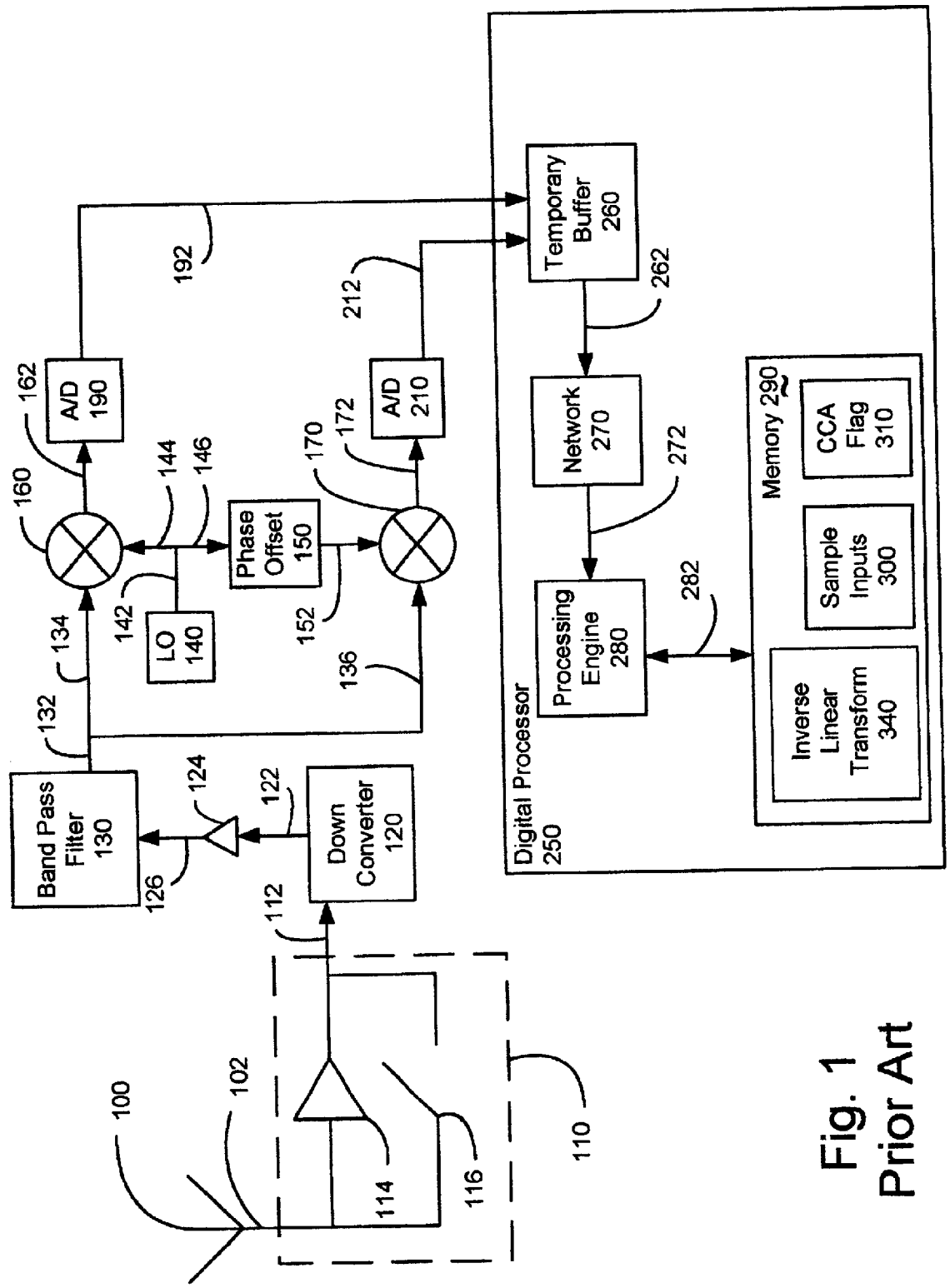
FIG. 1 depicts a prior art receiver of a Multi-Carrier Modulated (MCM) signal sensed by antenna element 100 and fed 102 to module 110.
Figure 2A:
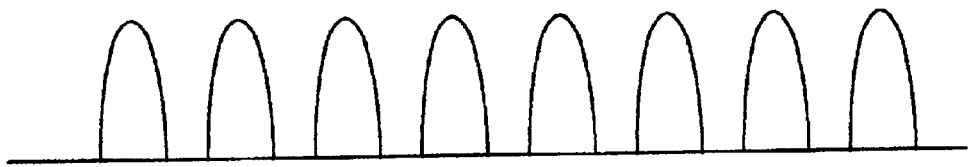
FIG. 2A depicts Frequency Division Multiple Access (FDMA) protocols, including GSM, using frequency bins separated by guard bands as the sub-carriers.
Figure 2B:
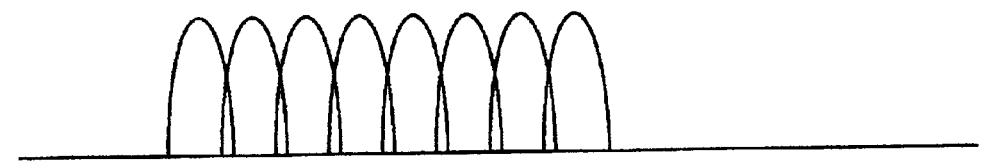
FIG. 2B depicts Orthogonal Frequency Division Multiplexing (OFDM) using densely spaced sub-carriers and overlapping spectra.
Figure 2C:
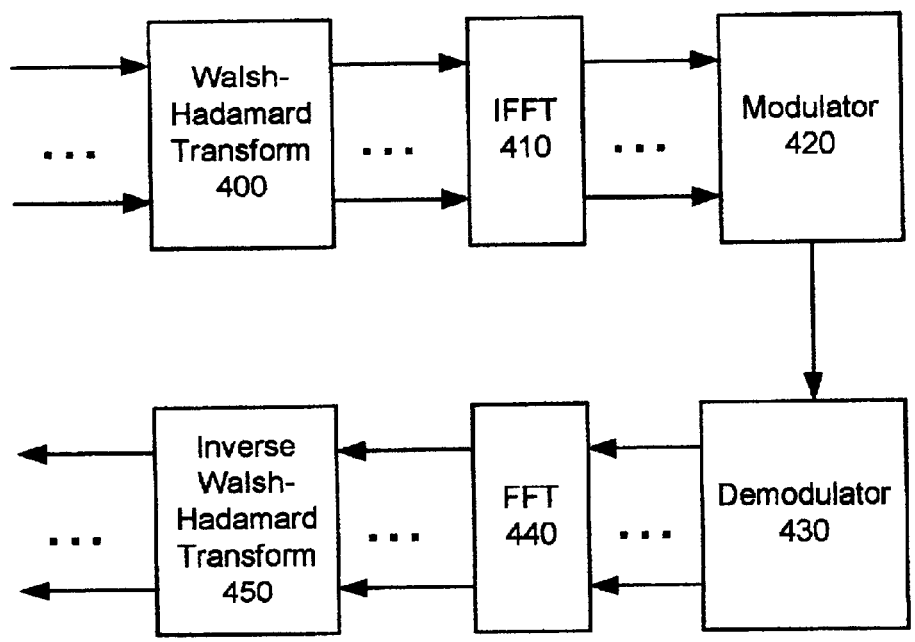
FIG. 2C depicts an OFDM technique used in conjunction with Direct Sequence Spread Spectrum techniques, to create CDMA-OFDM protocols.
Figure 2D:
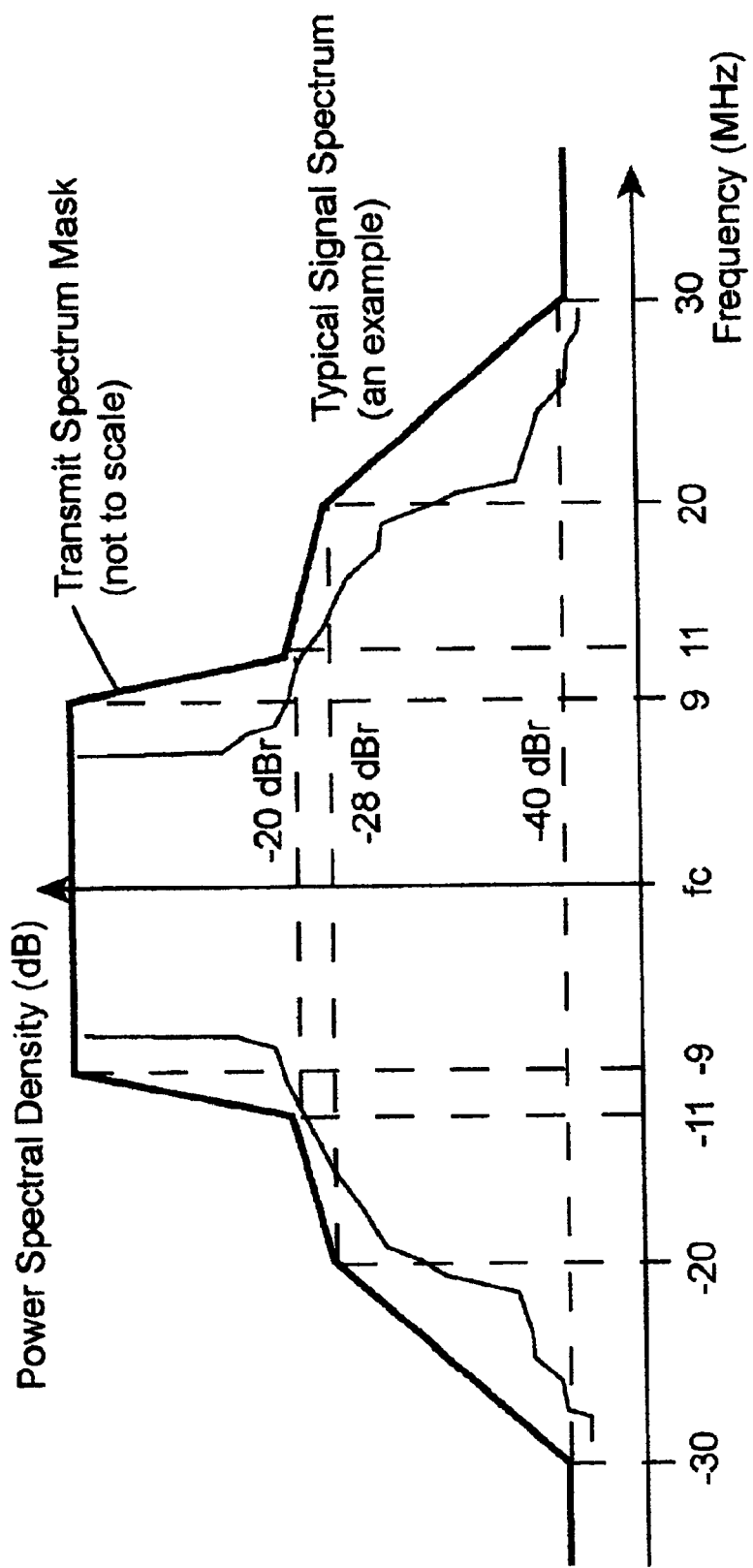
FIG. 2D depicts an example emitted power spectrum requirement for transmitted OFDM signals as found in FIG. 120 of the IEEE 802.11a protocol specification.
Figure 3:
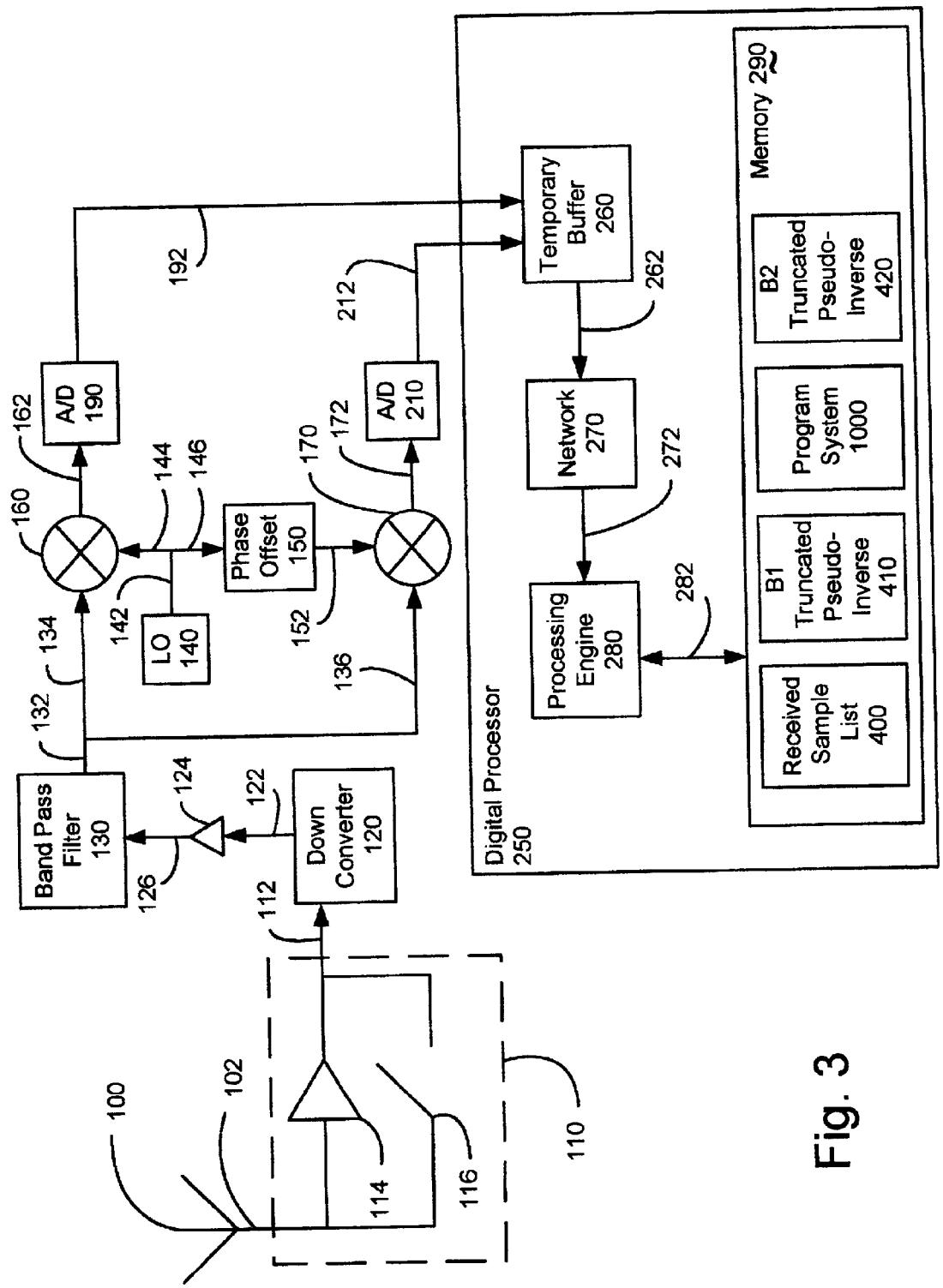
FIG. 3 depicts a system 250 for processing a sample list 260 of at least two digitized samples based upon at least one electromagnetic receptor 100 using at least a truncated pseudo-inverse B1 410.

FIG. 3 depicts a system 250 for processing a sample list 260 of at least two digitized samples based upon at least one electromagnetic receptor 100 using at least one truncated pseudo-inverse B1 410. Multiple truncated pseudo-inverses, such as B2 420, may be preferred in certain embodiments of the invention.

At least one processing engine 280 is receptively coupled 272-270-262-260-192-190-162-160-134-130-122-120-112-110-102 to the electromagnetic receptors 100 to provide the digitized samples 192. Processing engine 280 may be preferably controlled by a program system 1000 comprising program steps residing in memory 290 accessibly coupled 282 to the processing engine 280.

Program system 1000 preferably implements the inventive methods of operation. Alternatively, processing engine 280 may be hardwired to perform at least some of the steps of the methods described herein as implemented by program system 1000.

The method of operation is thus not reliant upon a device resembling a computer. The inventive operations discussed herein may be embodied by a variety of means besides a computer. By way of example, systems employing one or a combination of at least one of program counter driven instruction processor, finite state machines and pipelined dedicated processor engines, may be preferred for certain embodiments of the invention. The discussion of FIG. 11 will further point out some examples of such embodiments of the invention.

Processing engine 280 is also receptively coupled 272-270-262-260-212-210-172-170-136-130-122-120-112-110-102 to the electromagnetic receptors 100 to provide the digitized samples 212.

Figure 4A:
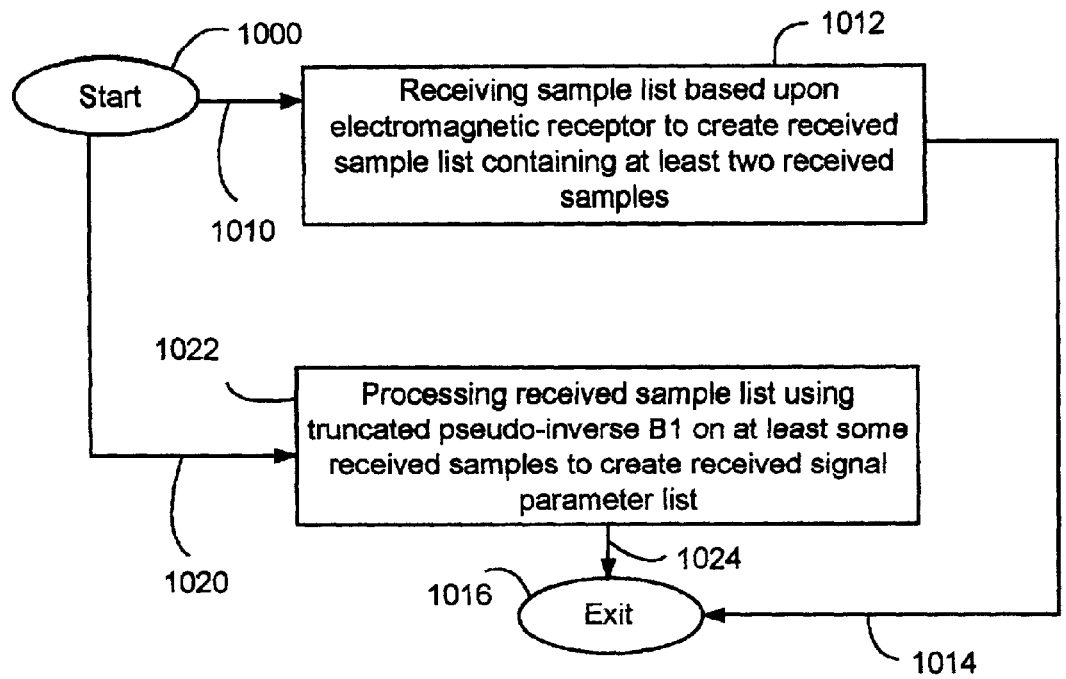
FIG. 4A depicts a detail flowchart of program system 1000 of FIG. 3 presenting program steps residing in memory 290 accessibly coupled 282 to processing engine 280.

FIG. 4A depicts a detail flowchart of program system 1000 of FIG. 3 presenting program steps residing in memory 290 accessibly coupled 282 to processing engine 280.

Arrow 1010 directs the flow of execution from starting operation 1000 to operation 1012. Operation 1012 performs receiving the sample list based upon the electromagnetic receptor to create a received sample list containing at least two received samples. Arrow 1014 directs execution from operation 1012 to operation 1016. Operation 1016 terminates the operations of this flowchart.

Arrow 1020 directs the flow of execution from starting operation 1000 to operation 1022. Operation 1022 performs processing the received sample list using the truncated pseudo-inverse B1 on at least some of the received samples to create a received signal parameter list containing at least one received signal parameter. Arrow 1024 directs execution from operation 1022 to operation 1016. Operation 1016 terminates the operations of this flowchart.

Note that the sample list is based upon a transported version of a signal progression generated using at least part of linear transform A1. The transported version of a signal progression will usually be modified by noise, which can be from any of a number of mechanisms. Noise mechanisms may include, but are not limited to, background noise of the physical transport layer(s), thermal noise found in the reception mechanism typified by the upper half of FIG. 3, as well as other potentially digital sources of noise including rounding errors in preceding calculations and digitization errors in the A/D converters.

Certain embodiments of the invention view the transport mechanism itself as including a linear transform A1 acting upon the baseband time progression in terms of its reception at one or more receptors and/or one or more antenna elements of one or more receptors.

Examples of such phenomena include, but are not limited to, radio signal propagation effects in air, often over time. These transforms can be derived from the propagation antenna lobe plots, which are usually done in polar coordinates. Rectangular grids in a polar coordinate system can be used to derive an angular versus temporal (propagation distance) based linear transform reasonably modeling the propagation effects. Such linear transforms are almost always singular. Often these linear transforms are between vector spaces of differing dimension, showing far more gradations of time/distance than angular gradations. Nonetheless, these transforms can be derived from the empirical lobe plots of the specific radio network. As such, their pseudo-inverses can be calculated and used to improve location resolution and/or improve the signal to noise ratio of the received signal.

In some circumstances, receivers can be found to have significant non-linear effects. Common causes of such effects include, but are not limited to, the non-linear effects of power transistors, amplifiers, among other effects. In certain circumstances, such non-linear effects can be adequately modeled using filter banks, which frequently employ a Discrete Wavelet Transform decomposition of the non-linear effect. When such a filter model can be accurately derived, a pseudo-inverse of the DWT matrix will yield the minimal least square estimate on the time varying stimulus driving the non-linear circuit element or system.

Certain embodiments of the invention may include two electromagnetic receptors receptively coupled to processing engine 250.

Figure 4B:
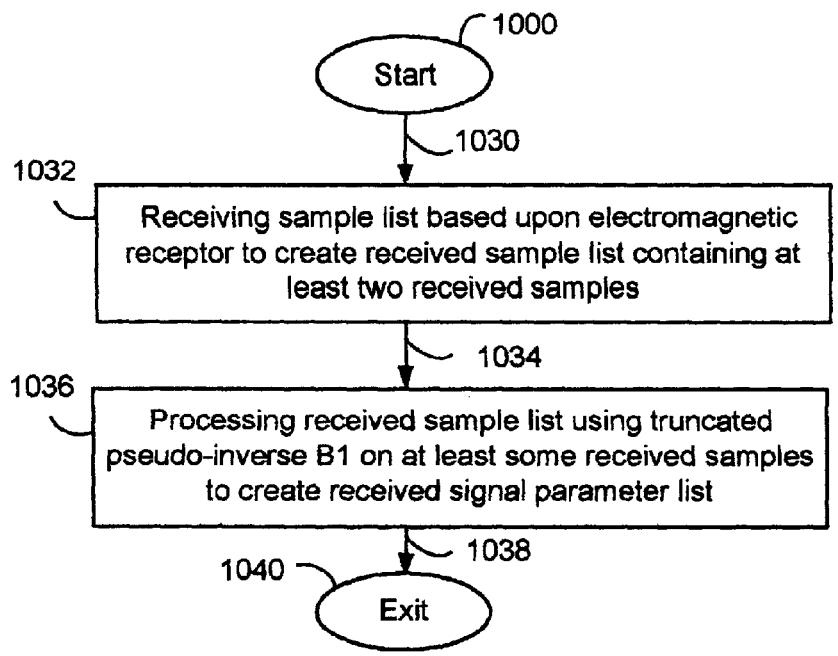
FIG. 4B depicts an alternative flowchart of program system 1000 of FIG. 3 presenting program steps residing in memory 290 accessibly coupled 282 to processing engine 280.

FIG. 4B depicts an alternative flowchart of program system 1000 of FIG. 3 presenting program steps residing in memory 290 accessibly coupled 282 to processing engine 280.

Arrow 1030 directs the flow of execution from starting operation 1000 to operation 1032. Operation 1032 performs receiving the sample list based upon the electromagnetic receptor to create a received sample list containing at least two received samples. Arrow 1034 directs execution from operation 1032 to operation 1036. Operation 1036 performs processing the received sample list using the truncated pseudo-inverse B1 on at least some of the received samples to create a received signal parameter list containing at least one received signal parameter. Arrow 1038 directs execution from operation 1036 to operation 1040. Operation 1040 terminates the operations of this flowchart.

One of skill in the art will recognize that FIGS. 4A and 4B depict equivalent operations, either of which may be preferred in different embodiments of the invention. FIG. 4A presents an execution mechanism commonly found in a real-time, often event driven, operating environment. FIG. 4B presents the operations as sequentially following one another, which is an approach often favored by some applications programming environments, emphasizing a flow of operations. In both FIGS. 4A and 4B, some or all of the depicted operations may be performed concurrently.

Certain embodiments of the invention may preferably interact with different electromagnetic receptors.

The electromagnetic receptor may include at least one antenna element, in which case the sample list based upon the electromagnetic receptor may be further derived from an electromagnetic field proximate with the antenna element. The electromagnetic receptor may include at least two antenna elements, in which case the sample list based upon the electromagnetic receptor may be further derived from the electromagnetic fields proximate with the antenna elements.

The electromagnetic receptor may include at least one semiconductor receptor element, in which case the sample list based upon the electromagnetic receptor may be further derived from an electromagnetic field based upon the bulk transport properties of the semiconductor receptor element. The electromagnetic receptor may further include at least two semiconductor receptor elements, in which case the sample list based upon the electromagnetic receptor may be further derived from an electromagnetic field based upon the bulk transport properties of the semiconductor receptor elements.

Examples of antenna elements include, but are not limited to, wire antennas, dipoles, quadrapoles, antenna arrays, horn antennas, and patch antennas, by way of example. Examples of semiconductor receptor elements include, but are not limited to, semiconductor lasers, masers, and Light Emitting Diodes (LEDs), by way of example. Semiconductor receptor elements may contain either crystalline materials and/or amorphous materials. Semiconductor receptor elements may contain either inorganic and/or organic compounds.

The electromagnetic receptor may be comprised of a first electromagnetic receptor and a second electromagnetic receptor. Such embodiments include receivers coupled to multiple antenna sites, as well as receivers coupled to multiple semiconductor receptors.

Figure 5A:
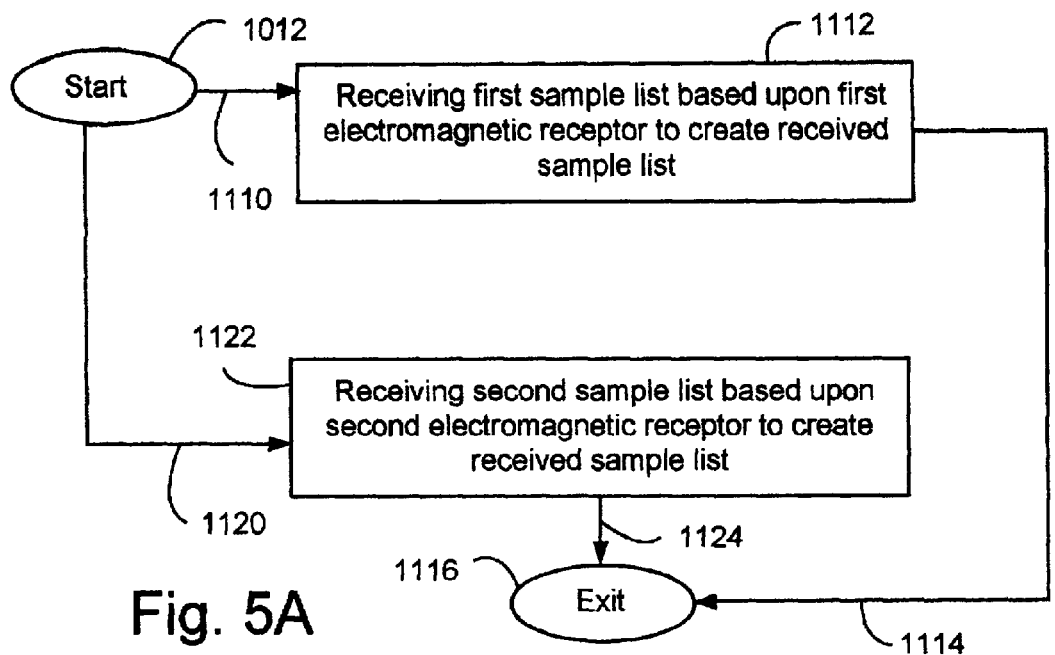
FIG. 5A depicts a detail flowchart of operation 1012 of FIG. 4A further receiving the sample list based upon the electromagnetic receptor.

FIG. 5A depicts a detail flowchart of operation 1012 of FIG. 4A further receiving the sample list based upon the electromagnetic receptor.

Arrow 1110 directs the flow of execution from starting operation 1012 to operation 1112. Operation 1112 performs receiving a first sample list based upon the first electromagnetic receptor to create the received sample list containing at least two received samples. Arrow 1114 directs execution from operation 1112 to operation 1116. Operation 1116 terminates the operations of this flowchart.

Arrow 1120 directs the flow of execution from starting operation 1012 to operation 1122. Operation 1122 performs receiving a second sample list based upon the second electromagnetic receptor to create the received sample list containing at least two received samples. Arrow 1124 directs execution from operation 1122 to operation 1116. Operation 1116 terminates the operations of this flowchart.

Note that receiving the sample list based upon the electromagnetic receptor may include at least one of the two performed operations of FIG. 5A.

Figure 5B:
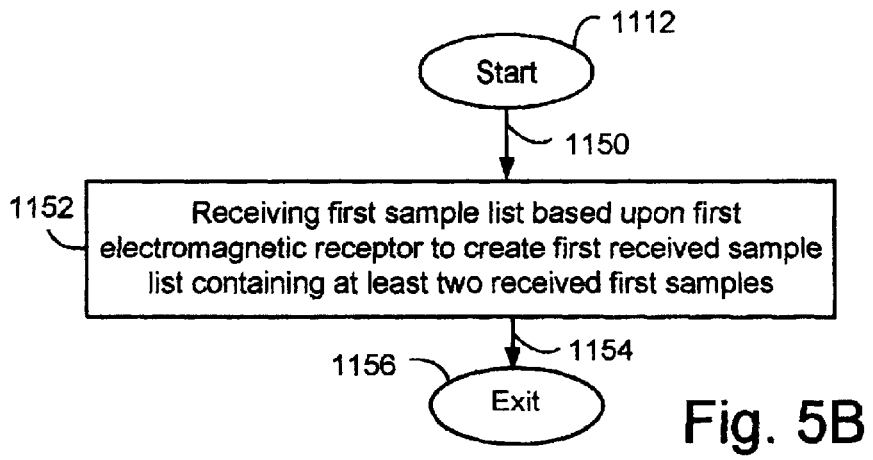
FIG. 5B depicts a detail flowchart of operation 1112 of FIG. 5A further receiving the first sample list based upon the first electromagnetic receptor.

FIG. 5B depicts a detail flowchart of operation 1112 of FIG. 5A further receiving the first sample list based upon the first electromagnetic receptor.

Arrow 1150 directs the flow of execution from starting operation 1112 to operation 1152. Operation 1152 performs receiving a first sample list based upon the first electromagnetic receptor to create a first received sample list containing at least two received first samples. Arrow 1154 directs execution from operation 1152 to operation 1156. Operation 1156 terminates the operations of this flowchart.

Figure 5C:
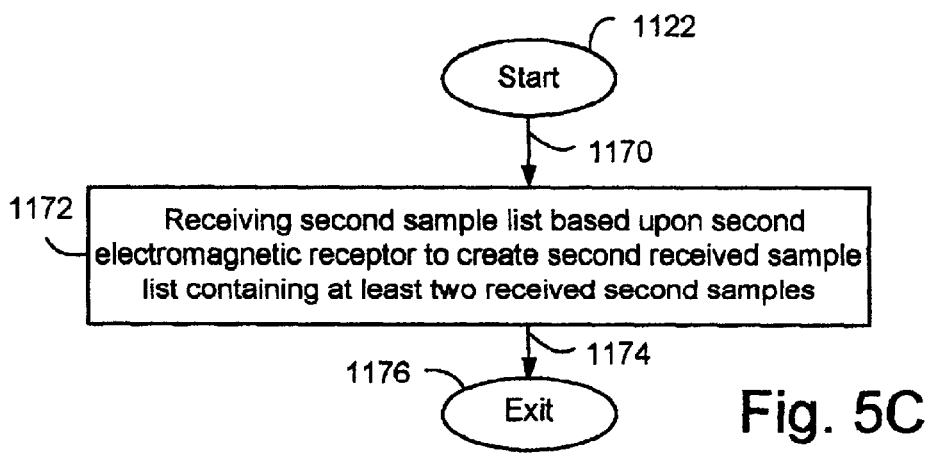
FIG. 5C depicts a detail flowchart of operation 1122 of FIG. 5A further receiving the second sample list based upon the second electromagnetic receptor.

FIG. 5C depicts a detail flowchart of operation 1122 of FIG. 5A further receiving the second sample list based upon the second electromagnetic receptor.

Arrow 1170 directs the flow of execution from starting operation 1122 to operation 1172. Operation 1172 performs receiving a second sample list based upon the second electromagnetic receptor to create a second received sample list containing at least two received second samples. Arrow 1174 directs execution from operation 1172 to operation 1176. Operation 1176 terminates the operations of this flowchart.

Figure 6A:
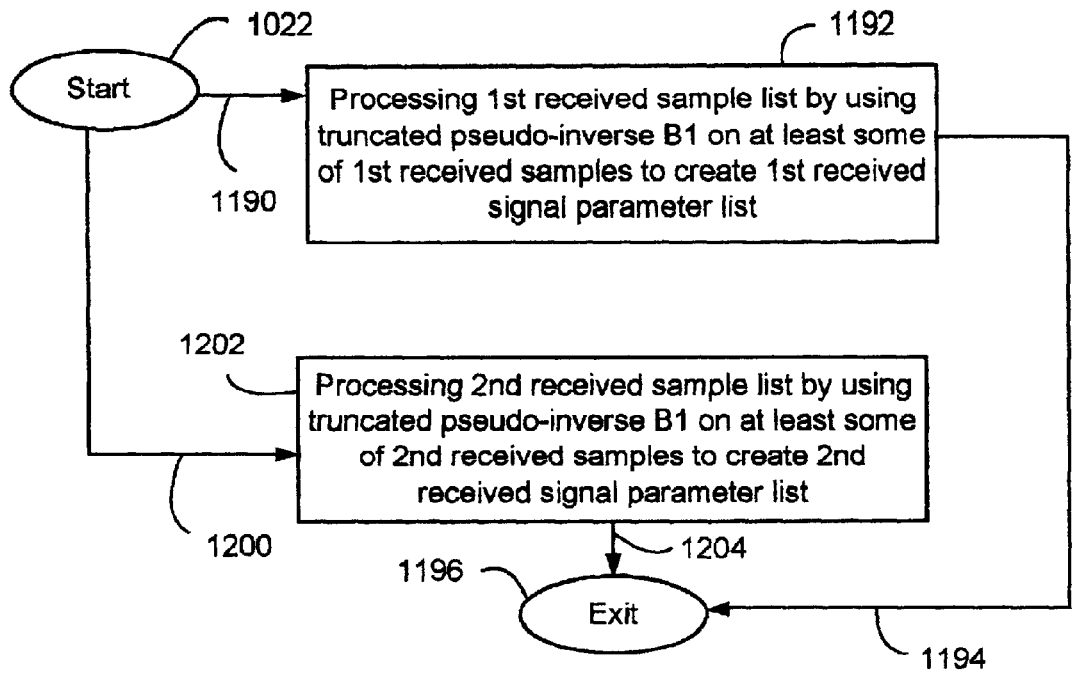
FIG. 6A depicts a detail flowchart of operation 1022 of FIG. 4A further processing the received sample list.

FIG. 6A depicts a detail flowchart of operation 1022 of FIG. 4A further processing the received sample list.

Arrow 1190 directs the flow of execution from starting operation 1022 to operation 1192. Operation 1192 performs processing the first received sample list by using the truncated pseudo-inverse B1 on at least some of the first received samples to create a first received signal parameter list containing at least one first received signal parameter. Arrow 1194 directs execution from operation 1192 to operation 1196. Operation 1196 terminates the operations of this flowchart.

Arrow 1200 directs the flow of execution from starting operation 1022 to operation 1202. Operation 1202 performs processing the second received sample list by using the truncated pseudo-inverse B1 on at least some of the second received samples to create a second received signal parameter list containing at least one second received signal parameter. Arrow 1204 directs execution from operation 1202 to operation 1196. Operation 1196 terminates the operations of this flowchart.

Note that it may be preferable to include just one of the two performed operations of FIG. 6A.

Note that it may be preferable to use more than one pseudo-inverse on the second received samples as shown in FIG. 3.

Figure 6B:
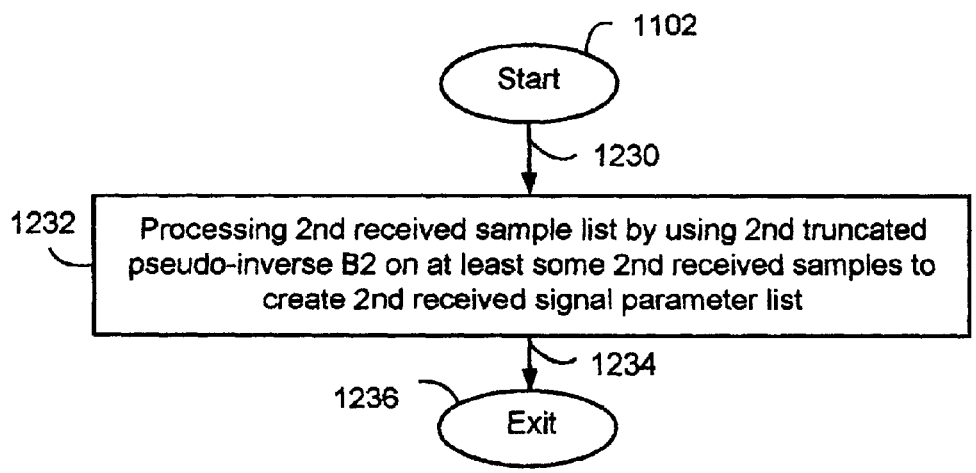
FIG. 6B depicts a detail flowchart of operation 1022 of FIG. 4A further processing the received sample list.

FIG. 6B depicts a detail flowchart of operation 1022 of FIG. 4A further processing the received sample list.

Arrow 1230 directs the flow of execution from starting operation 1022 to operation 1232. Operation 1232 performs processing the second received sample list by using a second truncated pseudo-inverse B2 420 of FIG. 3 on at least some of the second received samples to create a second received signal parameter list containing at least one second received signal parameter. Arrow 1234 directs execution from operation 1232 to operation 1236. Operation 1236 terminates the operations of this flowchart.

Truncated pseudo-inverse B1 410 of FIG. 3 may preferably contain at least a third truncated pseudo-inverse B3 and a fourth truncated pseudo-inverse B4.

Figure 6C:
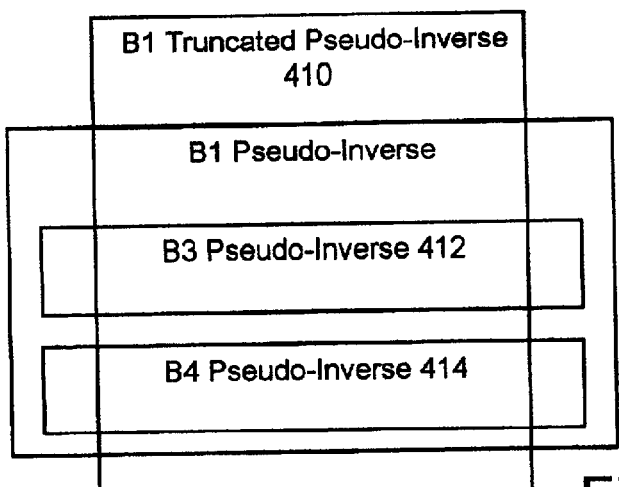
FIG. 6C depicts a matrix view of truncated pseudo-inverse B1 410 comprised of third truncated pseudo-inverse B3 412 and a fourth truncated pseudo-inverse B4 414, with B3 412 vertically arranged with respect to B4 414 and the effect of truncation upon these pseudo-inverses being the removal of columns.

FIG. 6C depicts a matrix view of truncated pseudo-inverse B1 410 comprised of third truncated pseudo-inverse B3 412 and a fourth truncated pseudo-inverse B4 414, with B3 412 vertically arranged with respect to B4 414 and the effect of truncation upon these pseudo-inverses being the removal of columns.

Figure 6D:
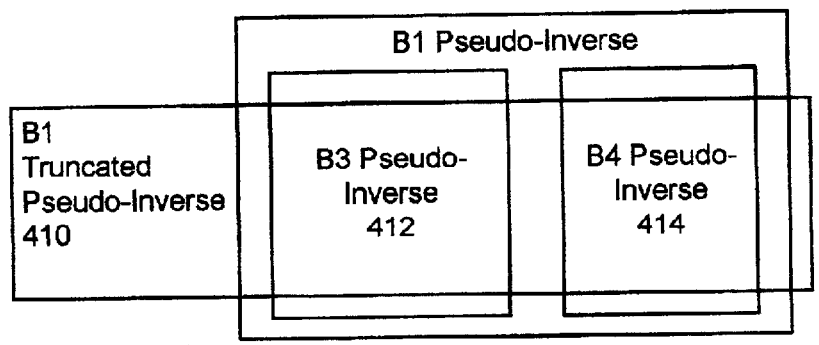
FIG. 6D depicts a matrix view of truncated pseudo-inverse B1 410 comprised of third truncated pseudo-inverse B3 412 and a fourth truncated pseudo-inverse B4 414, with B3 412 horizontally arranged with respect to B4 414 and the effect of truncation upon these pseudo-inverses being the removal of rows.

FIG. 6D depicts a matrix view of truncated pseudo-inverse B1 410 comprised of third truncated pseudo-inverse B3 412 and a fourth truncated pseudo-inverse B4 414, with B3 412 horizontally arranged with respect to B4 414 and the effect of truncation upon these pseudo-inverses being the removal of rows.

Figure 6E:
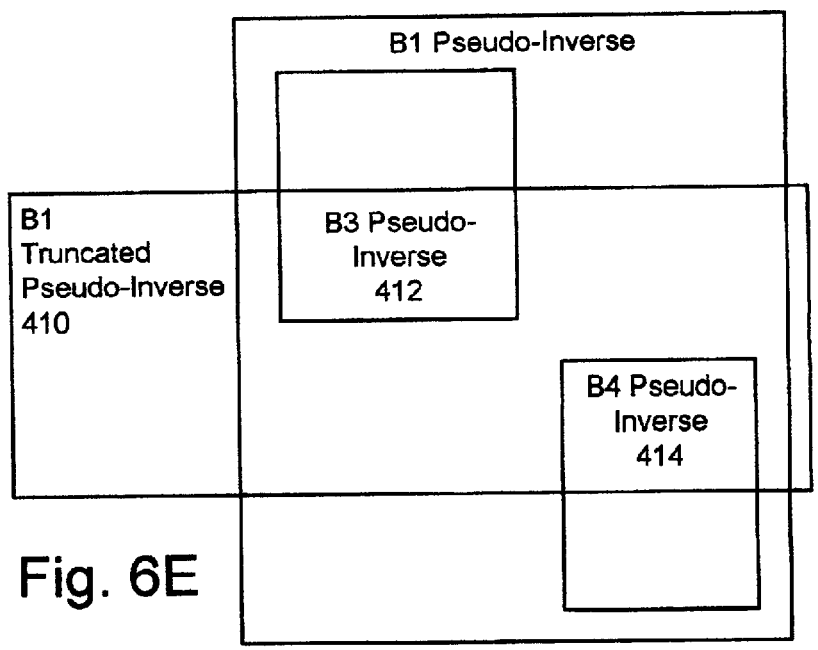
FIG. 6E depicts a matrix view of truncated pseudo-inverse B1 410 comprised of third truncated pseudo-inverse B3 412 and a fourth truncated pseudo-inverse B4 414, with B3 412 vertically and horizontally arranged with respect to B4 414 and the effect of truncation upon these pseudo-inverses being the removal of rows.

FIG. 6E depicts a matrix view of truncated pseudo-inverse B1 410 comprised of third truncated pseudo-inverse B3 412 and a fourth truncated pseudo-inverse B4 414, with B3 412 vertically and horizontally arranged with respect to B4 414 and the effect of truncation upon these pseudo-inverses being the removal of rows.

FIGS. 6C through 6E depict some embodiments of a truncated pseudo-inverse composed of more than one truncated pseudo-inverse. Such compositions may include pseudo-inverses of different types, B3 may be a Drazin pseudo-inverse and B4 may be a Moore-Penrose inverse, for example. Further note that the truncation process may remove rows or columns which are not adjacent to each other.

Figure 7A:
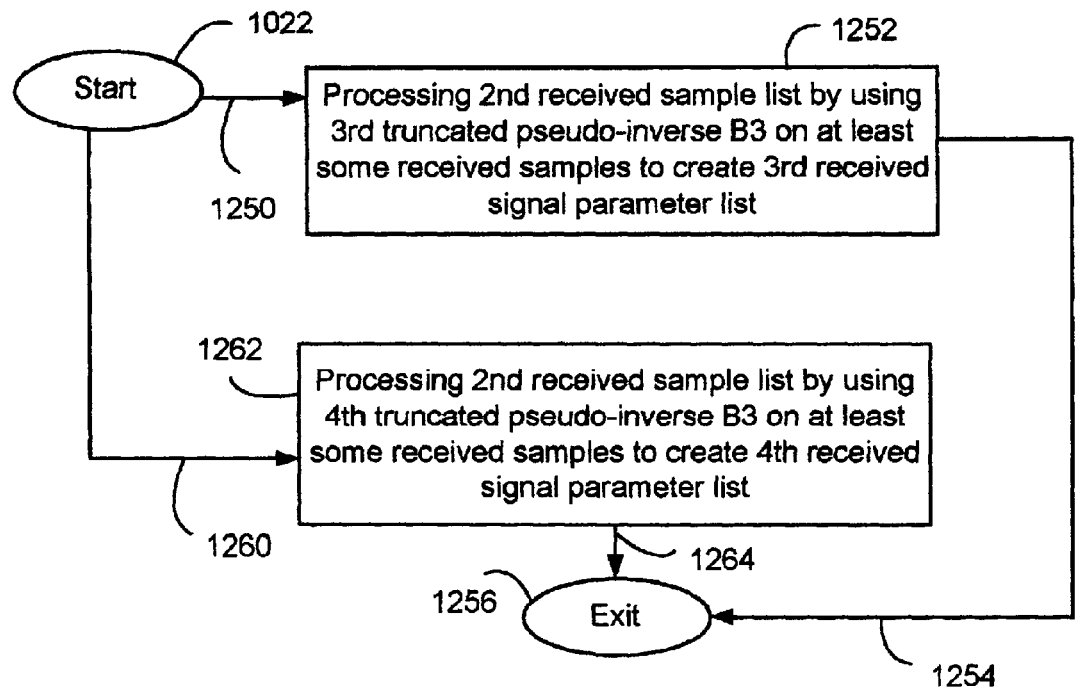
FIG. 7A depicts a detail flowchart of operation 1022 of FIG. 4A further processing the received sample list.

FIG. 7A depicts a detail flowchart of operation 1022 of FIG. 4A further processing the received sample list.

Arrow 1250 directs the flow of execution from starting operation 1022 to operation 1252. Operation 1252 performs processing the second received sample list by using the third truncated pseudo-inverse B3 on at least some of the received samples to create a third received signal parameter list containing at least one third received signal parameter. Arrow 1254 directs execution from operation 1252 to operation 1256. Operation 1256 terminates the operations of this flowchart.

Arrow 1260 directs the flow of execution from starting operation 1022 to operation 1262. Operation 1262 performs processing the second received sample list by using the fourth truncated pseudo-inverse B3 on at least some of the received samples to create a fourth received signal parameter list containing at least one fourth received signal parameter. Arrow 1264 directs execution from operation 1262 to operation 1256. Operation 1256 terminates the operations of this flowchart.

Certain embodiments of the invention include a method of determining availability of a first communications service based upon the third truncated pseudo-inverse B3 and of a second communications service based upon the fourth truncated pseudo-inverse B4 using the method processing the sample list.

Figure 7B:
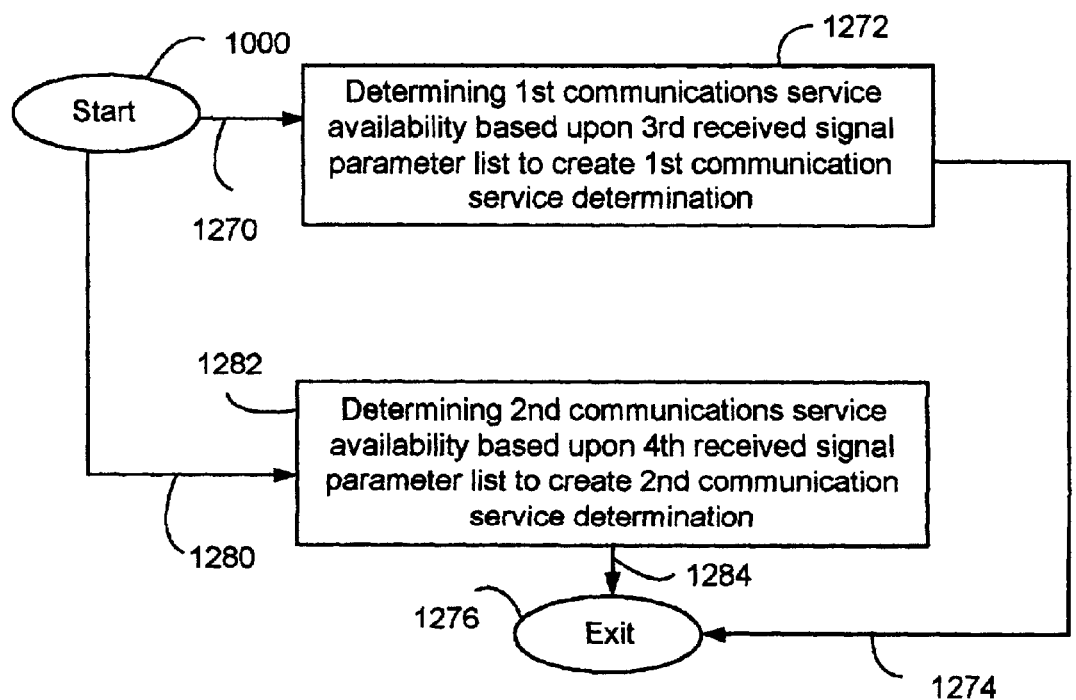
FIG. 7B depicts a detail flowchart of program system 1000 of FIG. 3 further determining availability of a first communications service based upon the third truncated pseudo-inverse B3 and of a second communications service based upon the fourth truncated pseudo-inverse B4.

FIG. 7B depicts a detail flowchart of program system 1000 of FIG. 3 further determining availability of a first communications service based upon the third truncated pseudo-inverse B3 and of a second communications service based upon the fourth truncated pseudo-inverse B4.

Arrow 1270 directs the flow of execution from starting operation 1000 to operation 1272. Operation 1272 performs determining the first communications service availability based upon the third received signal parameter list to create a first communication service determination. Arrow 1274 directs execution from operation 1272 to operation 1276. Operation 1276 terminates the operations of this flowchart.

Arrow 1280 directs the flow of execution from starting operation 1000 to operation 1282. Operation 1282 performs determining the second communications service availability based upon the fourth received signal parameter list to create a second communication service determination. Arrow 1284 directs execution from operation 1282 to operation 1276. Operation 1276 terminates the operations of this flowchart.

This method of determining availability of a first communications service and of a second communications service based upon the truncated pseudo-inverses and using the method processing the sample list may also be seen as a standalone application as follows. Such an application may preferably run upon wake-up in a transceiver.

Figure 8:
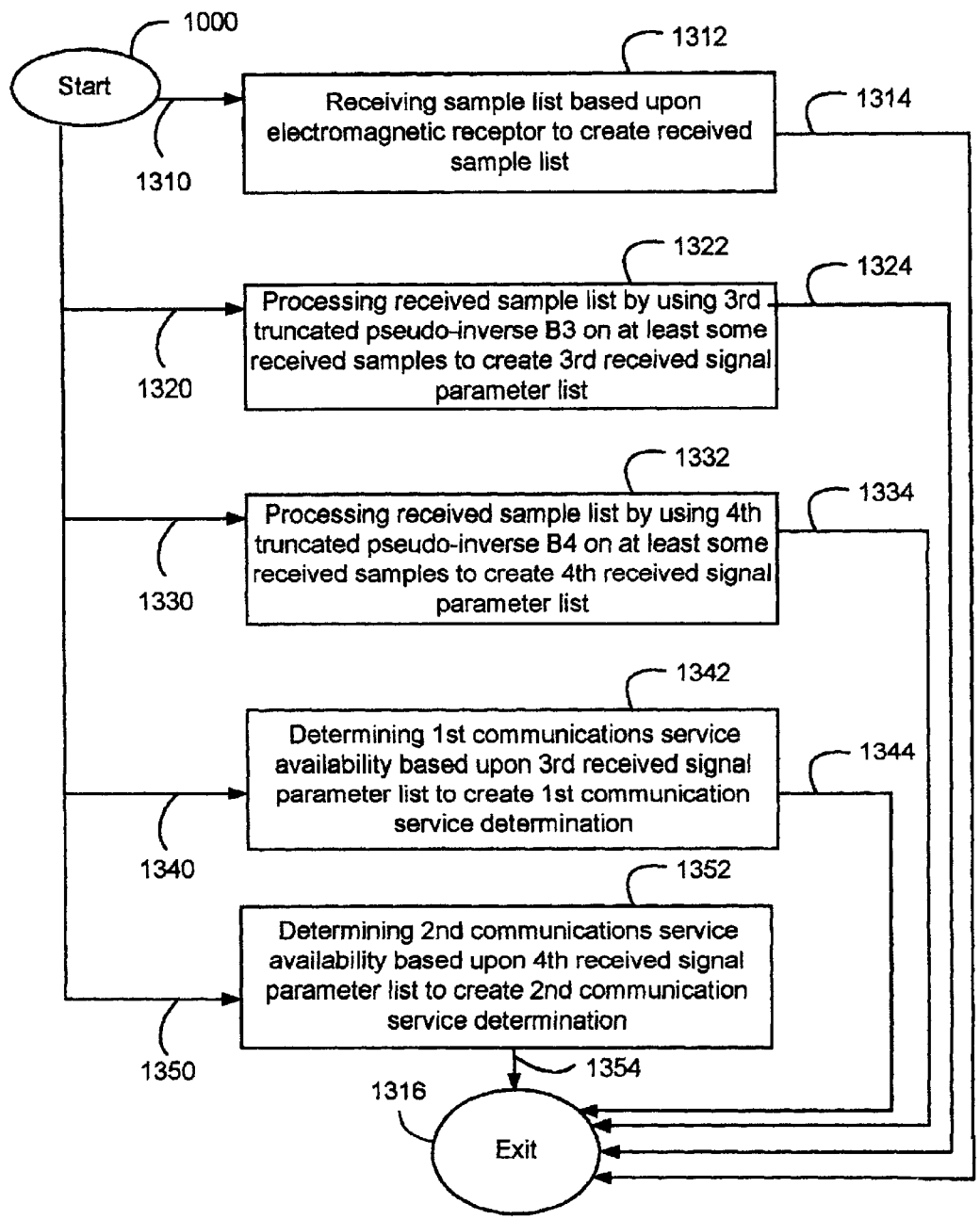
FIG. 8 depicts a detail flowchart of program system 1000 of FIG. 3 further determining availability of a first communications service based upon the third truncated pseudo-inverse B3 and of a second communications service based upon the fourth truncated pseudo-inverse B4 and using the method processing the sample list.

FIG. 8 depicts a detail flowchart of program system 1000 of FIG. 3 further determining availability of a first communications service based upon the third truncated pseudo-inverse B3 and of a second communications service based upon the fourth truncated pseudo-inverse B4 and using the method processing the sample list.

Arrow 1310 directs the flow of execution from starting operation 1000 to operation 1312. Operation 1312 performs receiving the sample list based upon the electromagnetic receptor to create a received sample list containing at least two received samples. Arrow 1314 directs execution from operation 1312 to operation 1316. Operation 1316 terminates the operations of this flowchart.

Arrow 1320 directs the flow of execution from starting operation 1000 to operation 1322. Operation 1322 performs processing the received sample list by using the third truncated pseudo-inverse B3 on at least some of the received samples to create a third received signal parameter list containing at least one third received signal parameter. Arrow 1324 directs execution from operation 1322 to operation 1316. Operation 1316 terminates the operations of this flowchart.

Arrow 1330 directs the flow of execution from starting operation 1000 to operation 1332. Operation 1332 performs processing the received sample list by using the fourth truncated pseudo-inverse B4 on at least some of the received samples to create a fourth received signal parameter list containing at least one fourth received signal parameter. Arrow 1334 directs execution from operation 1332 to operation 1316. Operation 1316 terminates the operations of this flowchart.

Arrow 1340 directs the flow of execution from starting operation 1000 to operation 1342. Operation 1342 performs determining the first communications service availability based upon the third received signal parameter list to create a first communication service determination. Arrow 1344 directs execution from operation 1342 to operation 1316. Operation 1316 terminates the operations of this flowchart.

Arrow 1350 directs the flow of execution from starting operation 1000 to operation 1352. Operation 1352 performs determining the second communications service availability based upon the fourth received signal parameter list to create a second communication service determination. Arrow 1354 directs execution from operation 1352 to operation 1316. Operation 1316 terminates the operations of this flowchart.

Figure 9A:
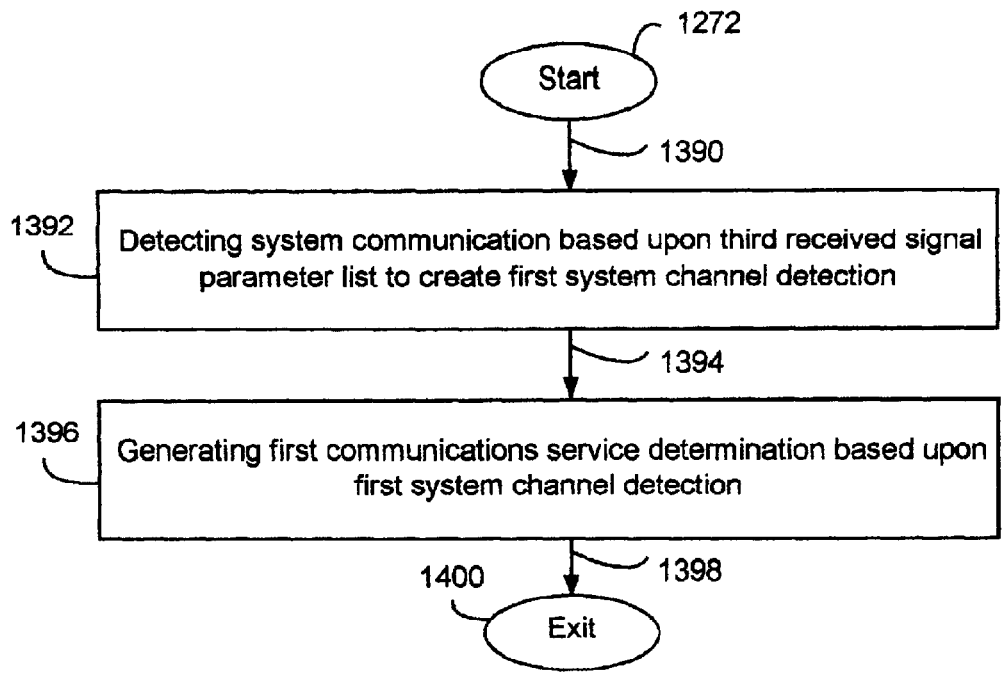
FIG. 9A depicts a detail flowchart of operation 1272 of FIG. 7A further determining the first communications service availability.

FIG. 9A depicts a detail flowchart of operation 1272 of FIG. 7A further determining the first communications service availability.

Arrow 1390 directs the flow of execution from starting operation 1272 to operation 1392. Operation 1392 performs detecting system communication based upon the third received signal parameter list to create a first system channel detection. Arrow 1394 directs execution from operation 1392 to operation 1396. Operation 1396 performs generating the first communications service determination based upon the first system channel detection. Arrow 1398 directs execution from operation 1396 to operation 2400. Operation 2400 terminates the operations of this flowchart.

FIG. 9A depicts the determination of the availability of communications service for a communication protocol relying upon at least one system channel being able to be detected and decoded. Examples of such MCM communications protocols include, but are not limited to, AMPs, GSM, IS-95, Edge, and W-CDMA.

Figure 9B:
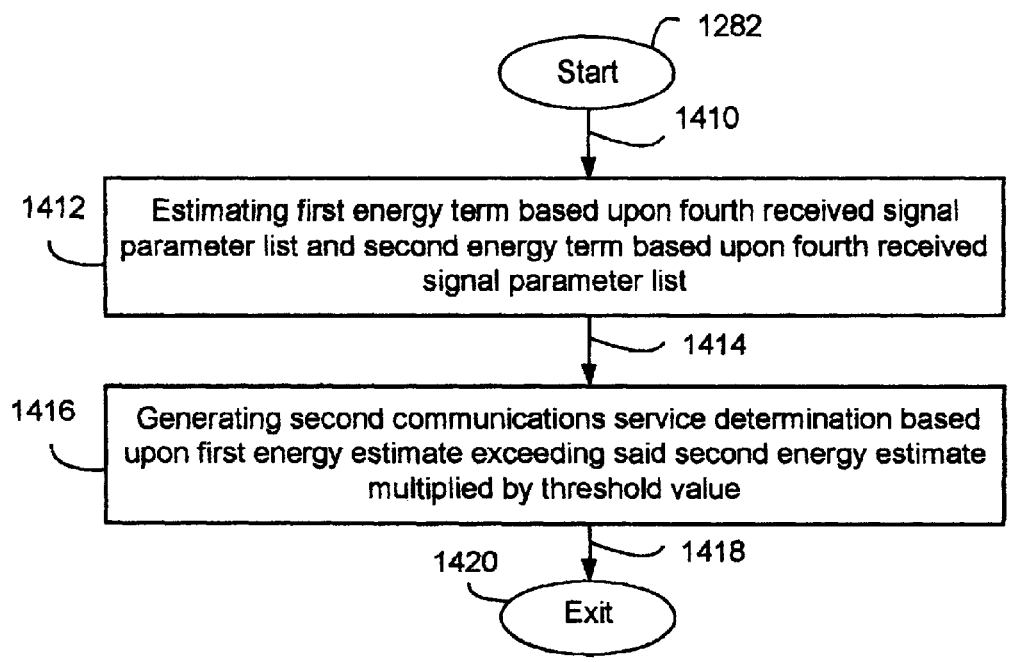
FIG. 9B depicts a detail flowchart of operation 1282 of FIG. 7A further determining the second communications service availability.

FIG. 9B depicts a detail flowchart of operation 1282 of FIG. 7A further determining the second communications service availability.

Arrow 1410 directs the flow of execution from starting operation 1282 to operation 1412. Operation 1412 performs estimating a first energy term based upon the fourth received signal parameter list and a second energy term based upon the fourth received signal parameter list. Arrow 1414 directs execution from operation 1412 to operation 1416. Operation 1416 performs generating the second communications service determination based upon the first energy estimate exceeding the second energy estimate multiplied by a threshold value. Arrow 1418 directs execution from operation 1416 to operation 1420. Operation 1420 terminates the operations of this flowchart.

Certain embodiments of the invention determine communications service availability by calculating a Clear Channel Assessment, CCA_flag for the communications protocol by estimating at least two energy terms based upon the value list. And generating the second communications service determination based upon whether the first energy term exceeds the second energy term multiplied by a threshold.

Such embodiments do not have to wait for synchronization with a training sequence or preamble. They rely instead upon the physical characteristics of the encoded channel of the communications protocol, which must expend energy above the noise floor for the signal to be received.

Such embodiments are applicable to the OFDM communications protocols in general, and to communication protocols compatible with the IEEE 802.11 specification in particular.

Some embodiments of the invention use estimates of the peak power versus the average power for the two energy terms, while other embodiments estimate the channel signal energy and the channel noise energy as the two energy terms.

Note that in certain embodiments of the invention, it may be preferred that both operation 1272 and 1282 determining distinct communication service capabilities employ similar mechanisms, that is, both may employ only one of the mechanisms of FIGS. 9A and 9B.

One of skill in the art will see that while the performed operations of FIGS. 9A and 9B are shown in an essentially sequential flow of control, they may equivalently be implemented in a concurrent real-time operating paradigm. The choice of portrayal in FIGS. 9A and 9B was made strictly to clarify the discourse and is not meant to limit the scope of the claims.

In certain embodiments of the invention the second communications service determination may preferably include a Clear Channel Access determination in a fashion applicable to at lease CSMA communications protocols.

The linear transform A may preferably include an FFT. Linear transform A may preferably be the FFT of 64 points as specified in IEEE 802.11a. Truncated pseudo-inverse B1 may preferably provide at least an approximation of the 52 active frequency bins of the IEEE 802.11a physical layer during data transmission.

Figure 10A:
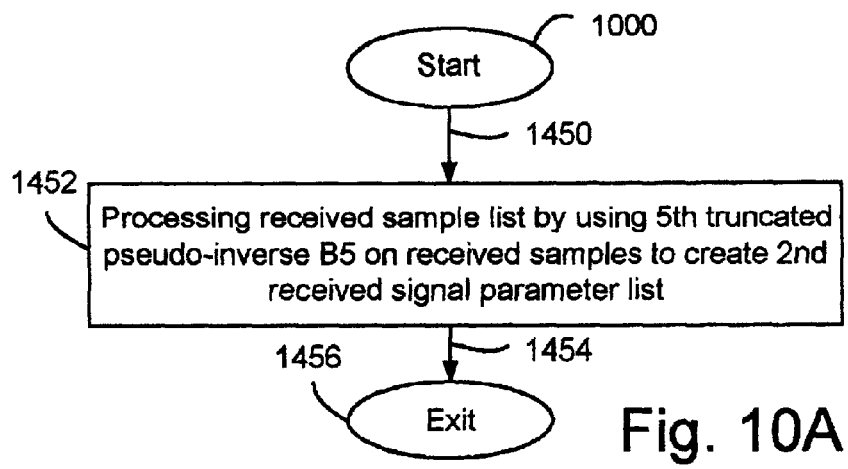
FIG. 10A depicts a detail flowchart of operation 1000 of FIGS. 7B and/or 8 further performing the method of determining availability of a first and second communications service based upon the truncated pseudo-inverses.

FIG. 10A depicts a detail flowchart of operation 1000 of FIGS. 7B and/or 8 further performing the method of determining availability of a first and second communications service based upon the truncated pseudo-inverses.

Arrow 1450 directs the flow of execution from starting operation 1000 to operation 1452. Operation 1452 performs processing the received sample list by using a fifth truncated pseudo-inverse B5 on at least some of the received samples to create a second received signal parameter list containing at least one second received signal parameter. Arrow 1454 directs execution from operation 1452 to operation 1456. Operation 1456 terminates the operations of this flowchart.

The fifth truncated pseudo-inverse B5 may preferably provide at least an approximation of the 12 active frequency bins of the IEEE 802.11a physical layer during header transmission.

Note that the operations described through FIG. 9B further describe what may preferably be a standalone application in certain embodiments of the invention supporting determination of a Clear Channel Access for a CSMA protocol such as IEEE 802.11a.

Figure 10B:
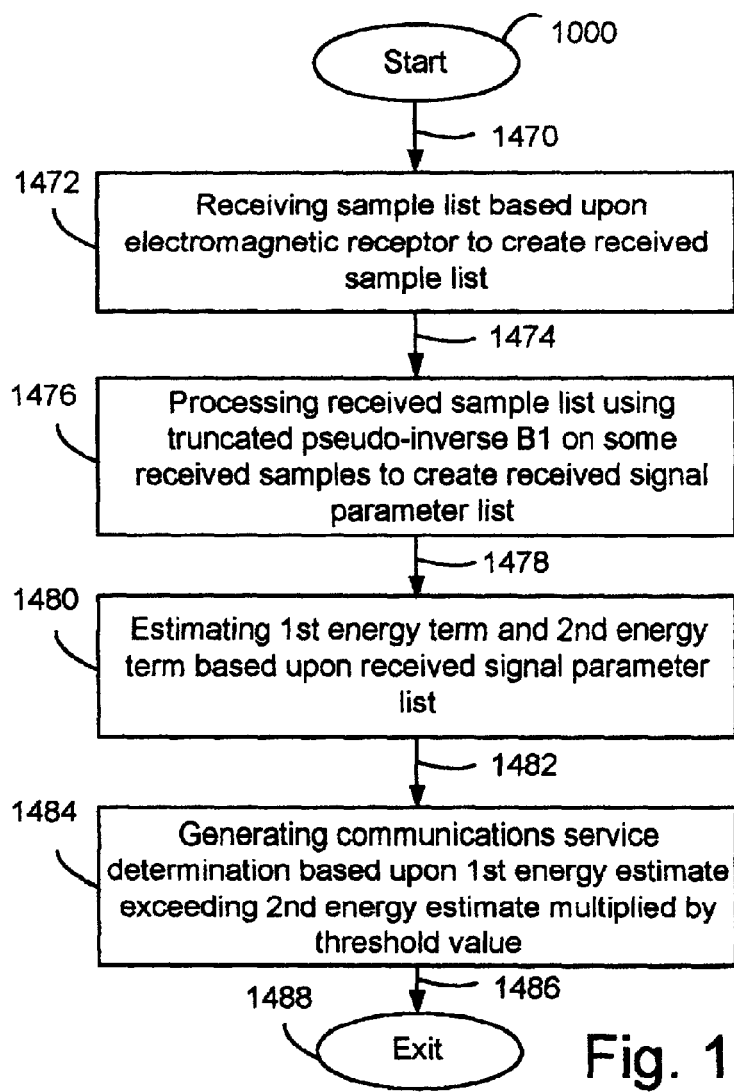

FIG. 10B depicts a detail flowchart of program system 1000 of FIG. 3 determining of a Clear Channel Access for a CSMA protocol such as IEEE 802.11a.

Arrow 1470 directs the flow of execution from starting operation 1000 to operation 1472. Operation 1472 performs receiving the sample list based upon the electromagnetic receptor to create a received sample list containing at least two received samples. Arrow 1474 directs execution from operation 1472 to operation 1476. Operation 1476 performs processing the received sample list by using the truncated pseudo-inverse B1 to at least some of the received samples to create a received signal parameter list containing at least one received signal parameter. Arrow 1478 directs execution from operation 1476 to operation 1480. Operation 1480 performs estimating a first energy term based upon the received signal parameter list and a second energy term based upon the received signal parameter list. Arrow 1482 directs execution from operation 1480 to operation 1484. Operation 1484 performs generating the communications service determination based upon the first energy estimate exceeding the second energy estimate multiplied by a threshold value. Arrow 1486 directs execution from operation 1484 to operation 1488. Operation 1488 terminates the operations of this flowchart.

One of skill in the art will recognize that the sample list may be further based upon a transported version of a baseband signal progression generated using at least part of linear transform A1.

The baseband signal progression may be further generated as a signal progression using at least part of a second linear transform A2.

The second linear transform A2 may be approximately similar to a Hadamard transform. Second linear transform A2 may be further approximately similar to a Walsh-Hadamard transform.

The truncating pseudo-inverse B1 may approximate a pseudo-inverse of at least part of linear transform A1 applied to at least part of a second linear transform A2.

Certain embodiments of the invention may include at least part of the second linear transform A2 providing a scattering transform applied to a time progression generated by using at least part of a spreading linear transform A3.

The truncating pseudo-inverse B1 may approximate a pseudo-inverse of at least part of linear transform A1 applied to at least part of the second linear transform A2 applied to at least part of the spreading linear transform A3.

Figure 11:
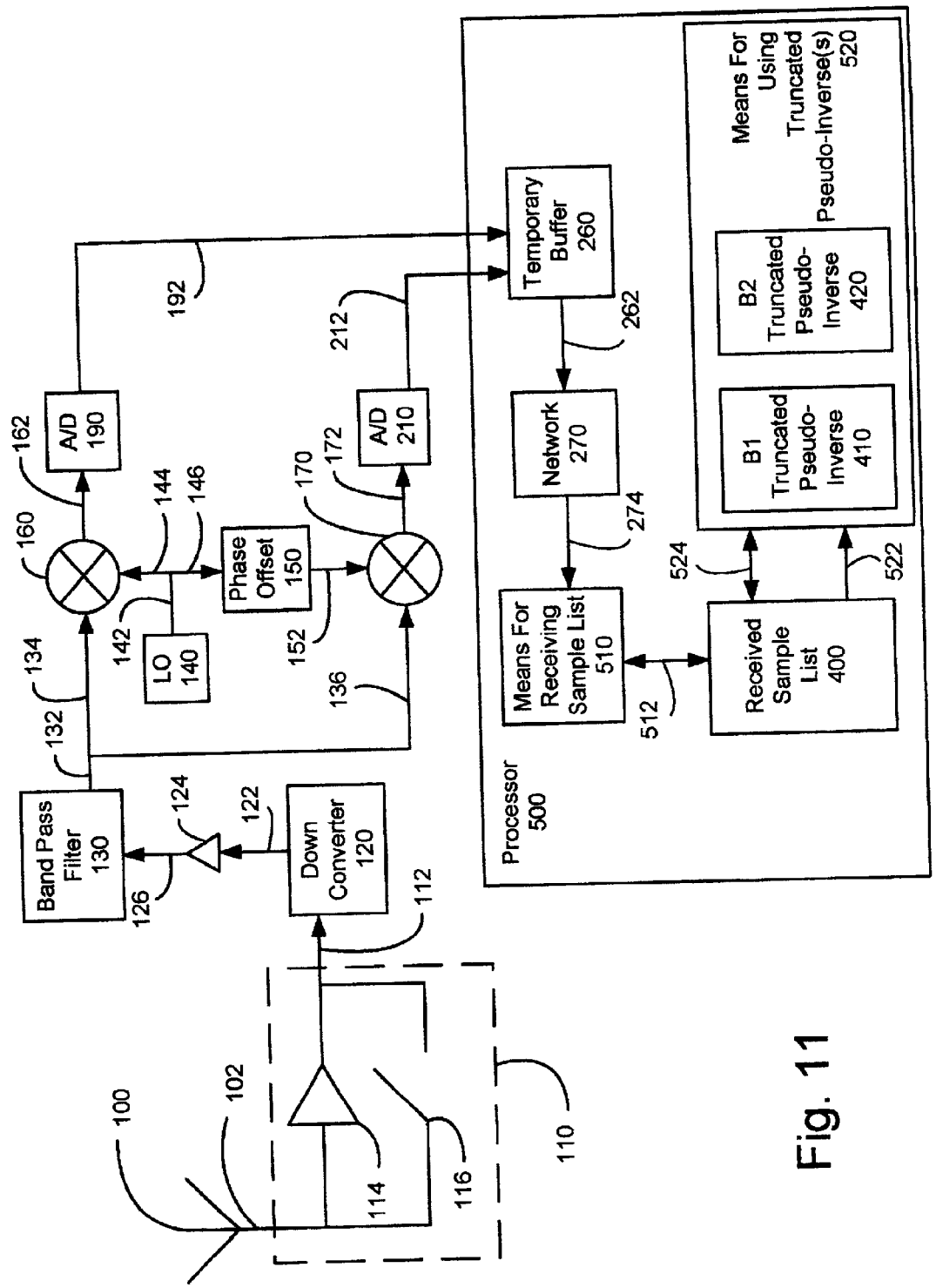
FIG. 11 depicts an alternative embodiment of the invention from that of FIG. 3 based upon at least one of a means for receiving the sample list 510 and a means for using truncated pseudo-inverses 520.

FIG. 11 depicts an alternative embodiment of the invention from that of FIG. 3 based upon at least one of a means for receiving the sample list 510 and a means for using truncated pseudo-inverses 520.

Processor 500 may embody at least some of the steps of the inventive methods as separate means for performing those steps.

At least one means 510 is receptively coupled 274-270-262-260-192-190-162-160-134-130-122-120-112-110-102 to the electromagnetic receptors 100 to provide the digitized samples 192.

The inventive operations discussed herein may be embodied by a variety of means besides a computer. By way of example, systems employing one or a combination of at least one of the following, program counter driven instruction processing, finite state machines and pipelined dedicated processor engines may be preferred for certain embodiments of the invention.

Means 510 may also receptively coupled 274-270-262-260-212-210-172-170-136-130-122-120-112-110-102 to the electromagnetic receptors 100 to provide the digitized samples 212.

Means 510 performs at least the operations of step 1012 of FIG. 4A. This includes, but is not limited to, receiving the sample list based upon the electromagnetic receptor to create a received sample list 400 containing at least two received samples.

Means 510 may employ one or a combination of mechanisms including, but not limited to, at least program counter driven instruction processing, finite state machines and pipelined dedicated processor engines for certain embodiments of the invention.

Means 510 provides a mechanism by which the digitized samples become 512 the received sample list 400, which can be readably accessed 522 by means 520. Note that it may be preferable in certain embodiments of the invention that means 520 be able to assert signals 524 for received sample list 400. Such asserted signals 524 may include, but are not limited to, addressing and control signals regulating which received samples or components of received samples are to be read, as well as potentially the ability to write data to the received sample list 400. Such embodiments may preferably support in-place calculations similar to in-place FFT calculations.

Means 520 performs at least the operations of step 1022 of FIG. 4A. This includes, but is not limited to, processing the received sample list by using the truncated pseudo-inverse B1 410 on at least some of the received samples in received sample list 400 to create a received signal parameter list containing at least one received signal parameter.

Means 520 may employ one or a combination of mechanisms including, but not limited to, at least program counter driven instruction processing, finite state machines and pipelined dedicated processor engines for certain embodiments of the invention.

Consider the following simulation experiment. Simulate a simple TX-channel-RX simulation chain (based on IEEE 802.11a specification) featuring two receivers: the first receiver is FFT-based receiver while the second one is a constrained DFT-based received. The transmitter is an IFFT-based transmitter compliant with the IEEE 802.11a specification. The channel is AWGN (subject to Average White Gaussian Noise) and a known interferer U is added to the transmit signal. The TX data- and pilot-bearing subcarriers (48+4=52 subcarriers referred to as "a") are saved and used in conjunction with the RX ones (referred to as "â") to construct a figure of merit which is the following normalized dot product:

$$FOM=(a-\hat{a})^*(a-\hat{a})'/(a^*a')$$

where superscript ' designates the hermitian transpose operator. The denominator is a normalizing quantity (that has the dimension of energy like the numerator).

The FOM is an indicator of the degree of proximity of frequency-domain vectors a and â. Ideally, in the absence of any noise or interferer or imperfections of any sort, â=a and FOM=0. The smaller the FOM the better.

The flow of operations is as follows:
1. Frequency-domain signal "a" is transformed by the IFFT to produce time-domain signal x (TX)
2. Noise as well as single interferer U are added to x to produce time-domain signal y=x+U+scaled noise
3. Time-domain signal y is transformed by an FFT to produce frequency-domain signal â (RX)
4. FOM is computed The constrained DFT matrix was generated as follows using Matlab: if M is the 64×52 DFT matrix obtained by truncating the full 64×64 matrix associated with IFFT and U is the 64-element column vector associated with the undesired interferer to be removed then the constrained DFT matrix to be used in the receiver is given by:

N=pinv([M U]); % compute pseudo-inverse (U may also designate a collection of vectors rather than a single one)

N=N(1:52,:); % truncate 53 (or whatever)×64 pseudo-inverse to obtain a 52×64 matrix â=N*y; % perform demodulation The simulation results clearly show the effect of using the constrained DFT over the FFT. By removing the expected interferer, the use of N reduces the gap between transmit and receive modulated signals (FOM converges towards zero or a noise-dependant threshold) thereby dramatically reducing the Burst Error Rate (BER) and/or Peak Error Rate(PER) loss due to U.

The residual FOM is due to the presence of AWGN, whose contribution cannot be eliminated by either the constrained DFT or by the FFT. The constrained DFT cancels only those signals that are a linear combination of the vectors spanning the subspace U.

Figure 12:
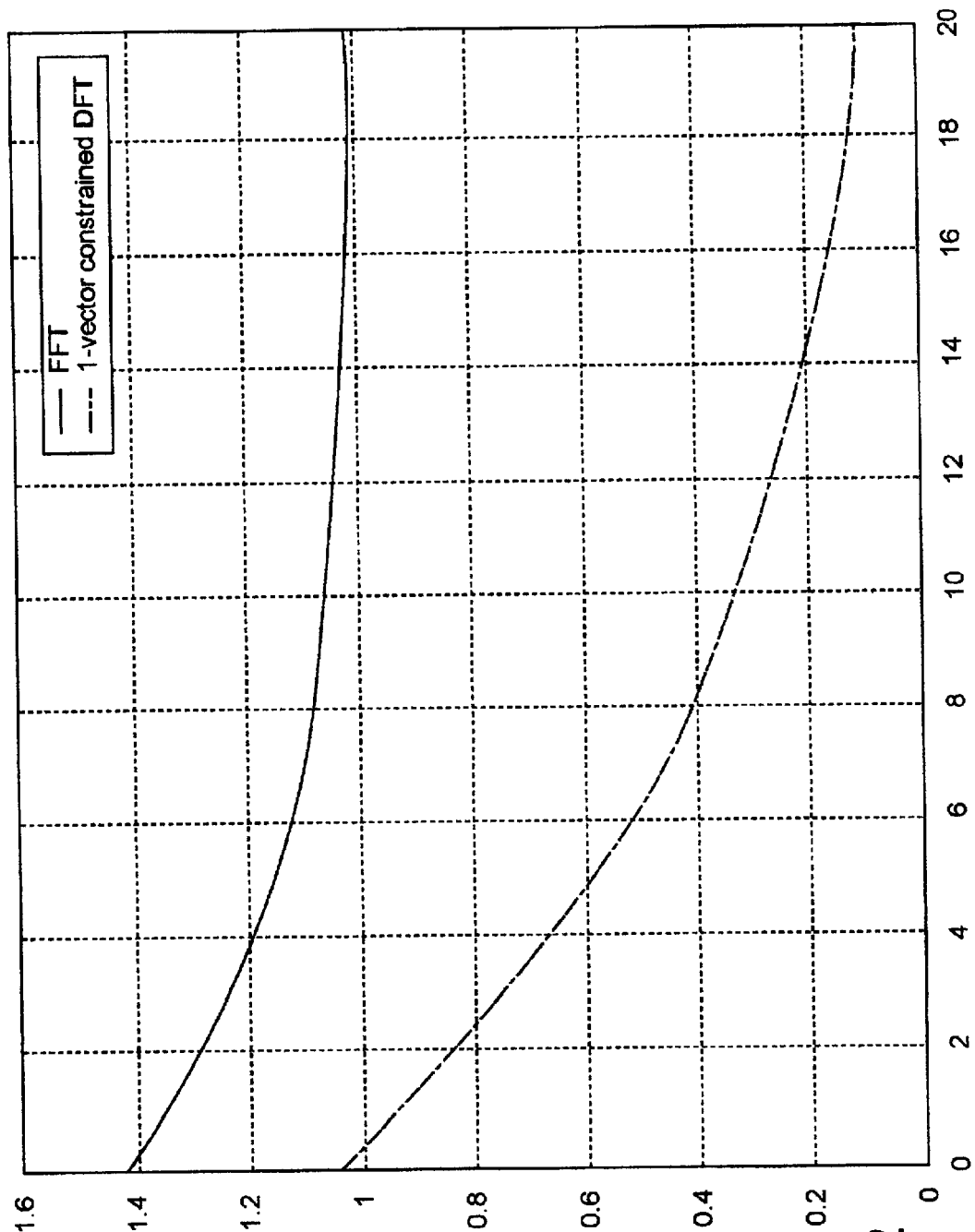
FIG. 12 depicts simulation results comparing FFT to truncated DFT with a one vector constrained subspace processing sample lists for a 64-QAM modulation scheme such as IEEE 802.11a employs across a channel exhibiting AWGN with one known interferer.

FIG. 12 depicts simulation results comparing FFT to truncated DFT with a one vector constrained subspace processing sample lists for a 64-QAM modulation scheme such as IEEE 802.11a employs across a channel exhibiting AWGN with one known interferer.

Figure 13:
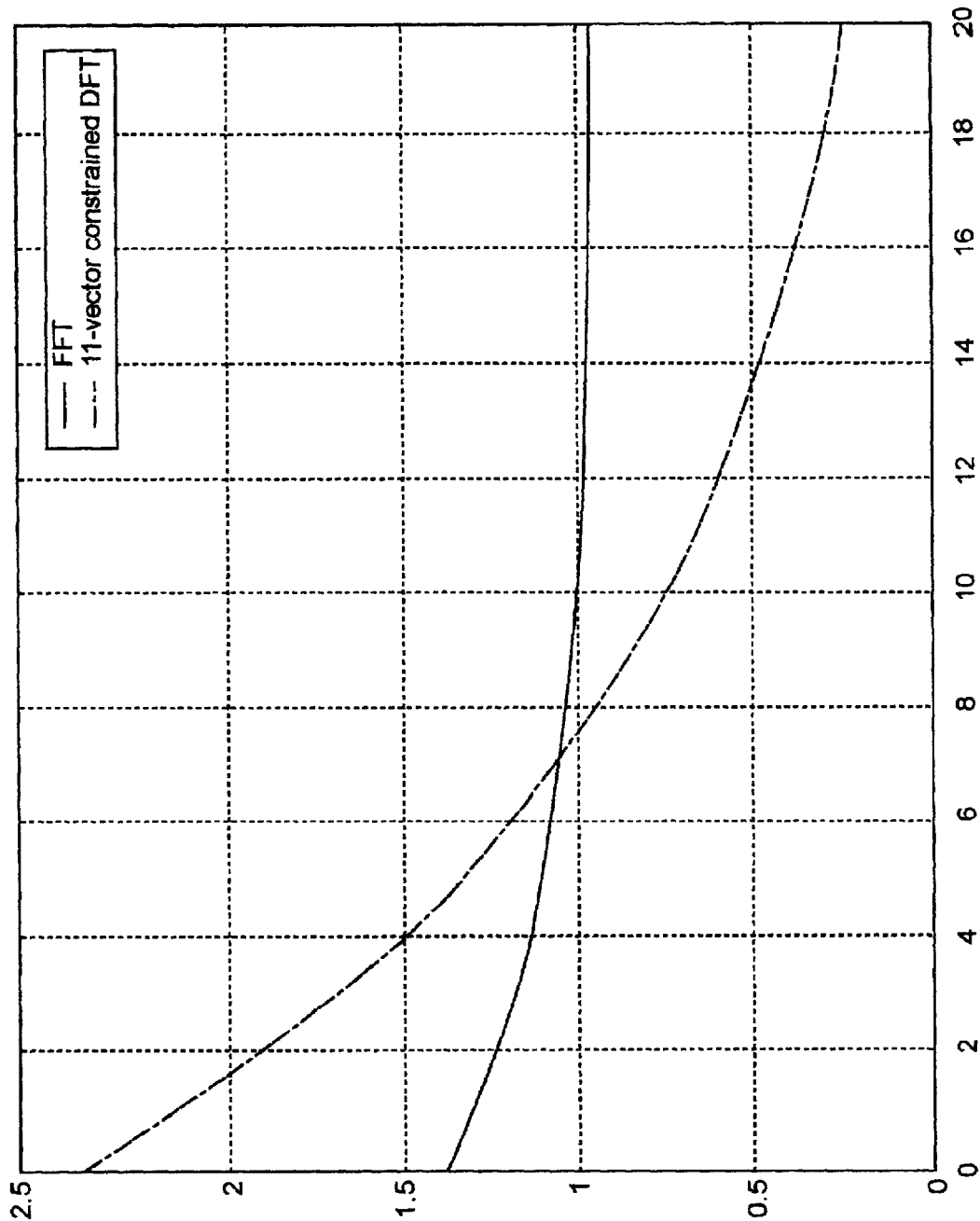
FIG. 13 depicts simulation results comparing FFT to truncated DFT with an eleven vector constrained subspace processing sample lists for a 64-QAM modulation scheme such as IEEE 802.11a employs across a channel exhibiting AWGN with one known interferer.

FIG. 13 depicts simulation results comparing FFT to truncated DFT with an eleven vector constrained subspace processing sample lists for a 64-QAM modulation scheme such as IEEE 802.11a employs across a channel exhibiting AWGN with one known interferer.

In both FIG. 12 and 13 the vertical axis represents the normalized Root Mean Square (RMS) error between a and â. This is the figure of merit in comparing implementations of differing constraint subspace dimension.

In both FIG. 12 and 13 the horizontal axis represents the Signal to Noise Ratio (SNR) in decibels (dB).

The simulation results indicate that the immunity to AWGN deteriorates as the dimension of the constraining subspace increases. There is a tradeoff between immunity to AWGN and the number of interferers (or to be more precise the dimension of the constraining subspace U) that can be cancelled. The simulation results show a penalty of a low SNR the larger the dimension of the constraint subspace.

Please note that it is also possible to remove any interferer from the received signal y by simply projecting y on the subspace orthogonal to U rather than using N. In this case, construct the projection operator as follows:

$$P=I-U^*\text{inv}(U'^*U)^*U'$$

This operator can be seen to be idempotent. Then, z=P*y is interferer-free, but can not be subsequently Fast Fourier Transformed since z is no longer colinear to x, because a and â are very likely to be far apart.

The preceding embodiments have been provided by way of example and are not meant to constrain the scope of the following claims.

What is claimed is:

1. A system processing a sample list of at least two digitized samples based upon at least one electromagnetic receptor using a truncated pseudo-inverse B1 of a linear transform A1, comprising:

at least one processing engine receptively coupled to said electromagnetic receptors to provide said digitized samples controlled by a program system comprising program steps residing in memory accessibly coupled to said processing engine;

wherein said program system comprising the program steps of:

receiving said sample list based upon said electromagnetic receptor to create a received sample list containing at least two received samples; and processing said received sample list by using said truncated pseudo-inverse B1 on at least some of said received samples to create a received signal parameter list containing at least one received signal parameter;

wherein said sample list is based upon a transported version of a signal progression generated using at least part of linear transform A1; and wherein said truncated pseudo-inverse B1 of said linear transform A1 is based upon a pseudo-inverse of A1 belonging to at least one member of the pseudo-inverse type collection comprising A1{1}, A1{2}, A1{3}, A1{4}, a Drazin inverse of A1, and a Moore-Penrose inverse A1{1,2,3,4}.

2. The system of claim 1, wherein said electromagnetic receptor includes at least one antenna element; and wherein said sample list based upon said electromagnetic receptor is further derived from an electromagnetic field proximate with said antenna element.

3. The system of claim 2, wherein said electromagnetic receptor includes at least two antenna elements; and wherein said sample list based upon said electromagnetic receptor is further derived from said electromagnetic fields proximate with said antenna elements.

4. The system of claim 1, wherein said electromagnetic receptor includes at least one semiconductor receptor element; and wherein said sample list based upon said electromagnetic receptor is further derived from an electromagnetic field based upon the bulk transport properties of said semiconductor receptor element.

5. The system of claim 4,
wherein said electromagnetic receptor further includes at least two semiconductor receptor elements; and
wherein said sample list based upon said electromagnetic receptor is further derived from an electromagnetic field based upon the bulk transport properties of said semiconductor receptor elements.

6. The system of claim 1,
wherein said electromagnetic receptor is comprised of a first electromagnetic receptor and a second electromagnetic receptor.

7. The system of claim 6,
wherein the program step receiving said sample list based upon said electromagnetic receptor is further comprised of at least one of the collection comprising the program steps of:
receiving a first sample list based upon said first electromagnetic receptor to create said received sample list containing at least two received samples; and
receiving a second sample list based upon said second electromagnetic receptor to create said received sample list containing at least two received samples.

8. The system of claim 7,
wherein the program step receiving said first sample list based upon said first electromagnetic receptor is further comprised of the program step of:
receiving a first sample list based upon said first electromagnetic receptor to create a first received sample list containing at least two received first samples; and
wherein the program step receiving said second sample list based upon said second electromagnetic receptor is further comprised of the program step of:
receiving a second sample list based upon said second electromagnetic receptor to create a second received sample list containing at least two received second samples.

9. The system of claim 8,
wherein the program step processing said received sample list is further comprised of at least one member of the collection comprising the program steps of:
processing said first received sample list by using said truncated pseudo-inverse B1 on at least some of said first received samples to create a first received signal parameter list containing at least one first received signal parameter; and
processing said second received sample list by using said truncated pseudo-inverse B1 on at least some of said second received samples to create a second received signal parameter list containing at least one second received signal parameter.

10. The system of claim 8,
wherein the program step processing said received sample list is further comprised of the program step of:
processing said second received sample list by using a second truncated pseudo-inverse B2 on at least some of said second received samples to create a second received signal parameter list containing at least one second received signal parameter.

11. The system of claim 1,
wherein said truncated pseudo-inverse B1 contains at least a third truncated pseudo-inverse B3 and a fourth truncated pseudo-inverse B4;

wherein the program step processing said received sample list further comprises the program steps of:
processing said second received sample list by using said third truncated pseudo-inverse B3 on at least some of said received samples to create a third received signal parameter list containing at least one third received signal parameter; and
processing said second received sample list by using said fourth truncated pseudo-inverse B3 on at least some of said received samples to create a fourth received signal parameter list containing at least one fourth received signal parameter.

12. A system of determining availability of a first communications service based upon said third truncated pseudo-inverse B3 and of a second communications service based upon said fourth truncated pseudo-inverse B4 comprising:
said system of claim 11;
wherein said program system is further comprised of the program steps of:
determining said first communications service availability based upon said third received signal parameter list to create a first communication service determination; and
determining said second communications service availability based upon said fourth received signal parameter list to create a second communication service determination.

13. The system of claim 12,
wherein the program step determining said first communications service availability is further comprised of the program steps of:
detecting system communication based upon said third received signal parameter list to create a first system channel detection; and
generating said first communications service determination based upon said first system channel detection.

14. The system of claim 12,
wherein the program step determining said second communications service availability is further comprised of the program steps of:
estimating a first energy term based upon said fourth received signal parameter list and a second energy term based upon said fourth received signal parameter list; and
generating said second communications service determination based upon said first energy estimate exceeding said second energy estimate multiplied by a threshold value.

15. The system of claim 14,
wherein said second communications service determination includes a Clear Channel Access determination.

16. The system of claim 14,
wherein said linear transform A1 includes a member of a collection comprising an FFT and an IFFT.

17. The system of claim 16,
wherein linear transform A1 is said IFFT of 64 points as specified in IEEE 802.11a; and
wherein said truncated pseudo-inverse B1 provides at least an approximation of the 52 active frequency bins of the IEEE 802.11a physical layer during data transmission.

18. The system of claim 17,
wherein said program system is further comprised of the program step of:
processing said received sample list by using a fifth truncated pseudo-inverse B5 to at least some of said received samples to create a second received signal parameter list containing at least one second received signal parameter.

19. The system of claim 18,
wherein said fifth truncated pseudo-inverse B5 provides at least an approximation of the 12 active frequency bins of the IEEE 802.11a physical layer during header transmission.

20. The system of claim 1,
wherein said linear transform A1 is a member of a collection comprising an FFT and an IFFT.

21. The system of claim 20,
wherein linear transform A1 is said IFFT of 64 points as specified in IEEE 802.11a; and
wherein said truncated pseudo-inverse B1 provides at least an approximation of the 52 active frequency bins of the IEEE 802.11a physical layer during data transmission.

22. The system of claim 21,
wherein said program systems is further comprised of the program step of:
  processing said received sample list by using a fifth truncated pseudo-inverse B5 to at least some of said received samples to create a second received signal parameter list containing at least one second received signal parameter.

23. The system of claim 22,
wherein said fifth truncated pseudo-inverse B5 provides at least an approximation of the 12 active frequency bins of the IEEE 802.11a physical layer during header transmission.

24. The system of claim 1,
wherein said sample list is further based upon a transported version of a baseband signal progression generated using at least part of linear transform A1.

25. The system of claim 24,
wherein said baseband signal progression is generated as a signal progression using at least part of a second linear transform A2.

26. The system of claim 25,
wherein said second linear transform A2 is approximately similar to a Hadamard transform.

27. The system of claim 26,
wherein said second linear transform A2 is further approximately similar to a Walsh-Hadamard transform.

28. The system of claim 25,
wherein said truncating pseudo-inverse B1 approximates a pseudo-inverse of said at least part of linear transform A1 applied to said at least part of a second linear transform A2.

29. The system of claim 28,
wherein using said at least part of said second linear transform A2 provides a scattering transform applied to a time progression generated by using at least part of a spreading linear transform A3.

30. The system of claim 29,
wherein said truncating pseudo-inverse B1 approximates a pseudo-inverse of said at least part of linear transform A1 applied to said at least part of said second linear transform A2 applied to said at least part of said spreading linear transform A3.

31. A method of processing a sample list of at least two digitized samples based upon at least one electromagnetic receptor using a truncated pseudo-inverse B1 of a linear transform A1, comprising the steps of:

receiving said sample list based upon said electromagnetic receptor to create a received sample list containing at least two received samples; and
processing said received sample list by using said truncated pseudo-inverse B1 on at least some of said received samples to create a received signal parameter list containing at least one received signal parameter;
wherein said sample list is based upon a transported version of a signal progression generated using at least part of linear transform A1; and
wherein said truncated pseudo-inverse B1 of said linear transform A1 is based upon a pseudo-inverse of A1 belonging to at least one member of the pseudo-inverse type collection comprising A1{1}, A1{2}, A1{3}, A1{4}, a Drazin inverse of A1, and a Moore-Penrose inverse A1{1,2,3,4}.

32. The method of claim 31,
wherein said electromagnetic receptor includes at least one antenna element; and
wherein said sample list based upon said electromagnetic receptor is further derived from an electromagnetic field proximate with said antenna element.

33. The method of claim 32,
wherein said electromagnetic receptor includes at least two antenna elements; and
wherein said sample list based upon said electromagnetic receptor is further derived from said electromagnetic fields proximate with said antenna elements.

34. The method of claim 31,
wherein said electromagnetic receptor includes at least one semiconductor receptor element; and
wherein said sample list based upon said electromagnetic receptor is further derived from an electromagnetic field based upon the bulk transport properties of said semiconductor receptor element.

35. The method of claim 34,
wherein said electromagnetic receptor further includes at least two semiconductor receptor elements; and
wherein said sample list based upon said electromagnetic receptor is further derived from an electromagnetic field based upon the bulk transport properties of said semiconductor receptor elements.

36. The method of claim 31,
wherein said electromagnetic receptor is comprised of a first electromagnetic receptor and a second electromagnetic receptor.

37. The method of claim 36,
wherein the step receiving said sample list based upon said electromagnetic receptor is further comprised of at least one of the collection comprising the steps of:
receiving a first sample list based upon said first electromagnetic receptor to create said received sample list containing at least two received samples; and
receiving a second sample list based upon said second electromagnetic receptor to create said received sample list containing at least two received samples.

38. The method of claim 37,
wherein the step receiving said first sample list based upon said first electromagnetic receptor is further comprised of the step of:
receiving a first sample list based upon said first electromagnetic receptor to create a first received sample list containing at least two received first samples; and
wherein the step receiving said second sample list based upon said second electromagnetic receptor is further comprised of the step of:

receiving a second sample list based upon said second electromagnetic receptor to create a second received sample list containing at least two received second samples.

39. The method of claim 38, wherein the step processing said received sample list is further comprised of at least one member of the collection comprising the steps of:

processing said first received sample list by using said truncated pseudo-inverse B1 on at least some of said first received samples to create a first received signal parameter list containing at least one first received signal parameter; and processing said second received sample list by using said truncated pseudo-inverse B1 on at least some of said second received samples to create a second received signal parameter list containing at least one second received signal parameter.

40. The method of claim 38, wherein the step processing said received sample list is further comprised of the step of:

processing said second received sample list by using a second truncated pseudo-inverse B2 on at least some of said second received samples to create a second received signal parameter list containing at least one second received signal parameter.

41. The method of claim 31, wherein said truncated pseudo-inverse B1 contains at least a third truncated pseudo-inverse B3 and a fourth truncated pseudo-inverse B4;

wherein the step processing said received sample list further comprises the steps of:

processing said second received sample list by using said third truncated pseudo-inverse B3 on at least some of said received samples to create a third received signal parameter list containing at least one third received signal parameter; and processing said second received sample list by using said fourth truncated pseudo-inverse B3 on at least some of said received samples to create a fourth received signal parameter list containing at least one fourth received signal parameter.

42. A method of determining availability of a first communications service based upon said third truncated pseudo-inverse B3 and of a second communications service based upon said fourth truncated pseudo-inverse B4 of the method of claim 41, comprising the steps of:

the method of claim 41; and further comprising the steps of:

determining said first communications service availability based upon said third received signal parameter list to create a first communication service determination; and determining said second communications service availability based upon said fourth received signal parameter list to create a second communication service determination.

43. The method of claim 42, wherein the step determining said first communications service availability is further comprised of the steps of:

detecting system communication based upon said third received signal parameter list to create a first system channel detection; and generating said first communications service determination based upon said first system channel detection.

44. The method of claim 42, wherein the step determining said second communications service availability is further comprised of the steps of:

estimating a first energy term based upon said fourth received signal parameter list and a second energy term based upon said fourth received signal parameter list; and generating said second communications service determination based upon said first energy estimate exceeding said second energy estimate multiplied by a threshold value.

45. The method of claim 44, wherein said second communications service determination includes a Clear Channel Access determination.

46. The method of claim 44, wherein said linear transform A1 includes a member of a collection comprising an FFT and an IFFT.

47. The method of claim 46, wherein linear transform A1 is said IFFT of 64 points as specified in IEEE 802.11a; and wherein said truncated pseudo-inverse B1 provides at least an approximation of the 52 active frequency bins of the IEEE 802.11a physical layer during data transmission.

48. The method of claim 47, further comprising the step of:

processing said received sample list by using a fifth truncated pseudo-inverse B5 to at least some of said received samples to create a second received signal parameter list containing at least one second received signal parameter.

49. The method of claim 48, wherein said fifth truncated pseudo-inverse B5 provides at least an approximation of the 12 active frequency bins of the IEEE 802.11a physical layer during header transmission.

50. The method of claim 31, wherein said linear transform A1 is a member of a collection comprising an FFT and an IFFT.

51. The method of claim 50, wherein linear transform A1 is said IFFT of 64 points as specified in IEEE 802.11a; and wherein said truncated pseudo-inverse B1 provides at least an approximation of the 52 active frequency bins of the IEEE 802.11a physical layer during data transmission.

52. The method of claim 51, further comprising the step of:

processing said received sample list by using a fifth truncated pseudo-inverse B5 to at least some of said received samples to create a second received signal parameter list containing at least one second received signal parameter.

53. The method of claim 52, wherein said fifth truncated pseudo-inverse B5 provides at least an approximation of the 12 active frequency bins of the IEEE 802.11a physical layer during header transmission.

54. The method of claim 31, wherein said sample list is further based upon a transported version of a baseband signal progression generated using at least part of linear transform A1.

55. The method of claim 54,
wherein said baseband signal progression is generated as a signal progression using at least part of a second linear transform A2.

56. The method of claim 55,
wherein said second linear transform A2 is approximately similar to a Hadamard transform.

57. The method of claim 56,
wherein said second linear transform A2 is further approximately similar to a Walsh-Hadamard transform.

58. The method of claim 55,
wherein said truncating pseudo-inverse B1 approximates a pseudo-inverse of said at least part of linear transform A1 applied to said at least part of a second linear transform A2.

59. The method of claim 58,
wherein using said at least part of said second linear transform A2 provides a scattering transform applied to a time progression generated by using at least part of a spreading linear transform A3.

60. The method of claim 59,
wherein said truncating pseudo-inverse B1 approximates a pseudo-inverse of said at least part of linear transform A1 applied to said at least part of said second linear transform A2 applied to said at least part of said spreading linear transform A3.

61. A program system implementing the method of claim 31,
wherein said program system controlling reception of communications encoded as a time progression using said linear transformation A1 through the execution of program steps implementing at least the steps of the method,
wherein said program system is comprised of said program steps residing in memory accessibly coupled to at least one processing engine receptively coupled to said electromagnetic receptors to provide said digitized samples.

62. A system for processing a sample list of at least two digitized samples based upon at least one electromagnetic receptor using a truncated pseudo-inverse B1 of a linear transform A1 implementing the method of claim 31, comprising:
means for receiving said sample list based upon said electromagnetic receptor to create a received sample list containing at least two received samples; and
means for processing said received sample list by using said truncated pseudo-inverse B1 to at least some of said received samples to create a received signal parameter list containing at least one received signal parameter;
wherein said sample list is based upon a transported version of a signal progression generated using at least part of linear transform A1.

63. The system of claim 62,
wherein said means for receiving said sample list based upon said electromagnetic receptor to create a received sample list containing at least two received samples, is further comprised of:
a finite state machine controlling a buffer memory containing at least two memory locations through the operation of at least two finite states of a finite states of said finite state machine; and
said buffer memory receptively coupled to said electromagnetic receptor;
wherein said finite state machine operating through said at least two finite states causes said buffer memory to contain said received samples contained in said received sample list.

64. The system of claim 62,
wherein said means for processing said received sample list by using said truncated pseudo-inverse B1 is further comprised of:
an arithmetic circuit implementing said truncated pseudo-inverse B1 acting on at least some of said received samples to create said received signal parameter list containing said at least one received signal parameter;
wherein said means for receiving said received sample list provides said received samples to said arithmetic circuit.

65. The system of claim 64,
wherein said arithmetic circuit implementing said truncated pseudo-inverse B1 is controlled by a second finite state machine.

66. The system of claim 65,
wherein said second finite state machine includes a state register containing a program counter.

67. The system of claim 64,
wherein said arithmetic circuit implementing said truncated pseudo-inverse B1 is controlled strictly by input-output stimulus.

68. A system determining availability of a first communications service based upon a third truncated pseudo-inverse B3 and of a second communications service based upon a fourth truncated pseudo-inverse B4 from a sample list of at least two digitized samples based upon at least one electromagnetic receptor, comprising:
at least one processing engine receptively coupled to said electromagnetic receptors to provide said digitized samples controlled by a program system comprising program steps residing in memory accessibly coupled to said processing engine;
wherein said program system is comprised of the program steps of:
receiving said sample list based upon said electromagnetic receptor to create a received sample list containing at least two received samples; and
processing said second received sample list by using said third truncated pseudo-inverse B3 on at least some of said received samples to create a third received signal parameter list containing at least one third received signal parameter;
processing said second received sample list by using said fourth truncated pseudo-inverse B3 on at least some of said received samples to create a fourth received signal parameter list containing at least one fourth received signal parameter;
determining said first communications service availability based upon said third received signal parameter list to create a first communication service determination; and
determining said second communications service availability based upon said fourth received signal parameter list to create a second communication service determination;
wherein a truncated pseudo-inverse B3 is based upon a linear transform A1;
wherein said fourth truncated pseudo-inverse B4 is based upon a linear transform A2;
wherein said sample list is based upon a transported version of a signal progression generated using at least part of at least one member of a linear transform collection comprising said linear transform A1 and said linear transform A2; and wherein said truncated pseudo-inverse B1 of said linear transform A1 is based upon a pseudo-inverse of A1 belonging to at least one member of the pseudo-inverse type collection comprising A1{1}, A1{2}, A1{3}, A1{4}, a Drazin inverse of A1, and a Moore-Penrose inverse A1{1,2,3,4}.

69. The system of claim 68, wherein said electromagnetic receptor includes at least one antenna element; and wherein said sample list based upon said electromagnetic receptor is further derived from an electromagnetic field proximate with said antenna element.

70. The system of claim 69, wherein said electromagnetic receptor includes at least two antenna elements; and wherein said sample list based upon said electromagnetic receptor is further derived from said electromagnetic fields proximate with said antenna elements.

71. The system of claim 68, wherein said electromagnetic receptor includes at least one semiconductor receptor element; and wherein said sample list based upon said electromagnetic receptor is further derived from an electromagnetic field based upon the bulk transport properties of said semiconductor receptor element.

72. The system of claim 71, wherein said electromagnetic receptor further includes at least two semiconductor receptor elements; and wherein said sample list based upon said electromagnetic receptor is further derived from an electromagnetic field based upon the bulk transport properties of said semiconductor receptor elements.

73. The system of claim 68, wherein said electromagnetic receptor is comprised of a first electromagnetic receptor and a second electromagnetic receptor.

74. The system of claim 73, wherein the program step receiving said sample list based upon said electromagnetic receptor is further comprised of at least one of the collection comprising the program steps of:

receiving a first sample list based upon said first electromagnetic receptor to create said received sample list containing at least two received samples; and receiving a second sample list based upon said second electromagnetic receptor to create said received sample list containing at least two received samples.

75. The system of claim 74, wherein the program step receiving said first sample list based upon said first electromagnetic receptor is further comprised of the program step of:

receiving a first sample list based upon said first electromagnetic receptor to create a first received sample list containing at least two received first samples; and wherein the program step receiving said second sample list based upon said second electromagnetic receptor is further comprised of the program step of:

receiving a second sample list based upon said second electromagnetic receptor to create a second received sample list containing at least two received second samples.

76. The system of claim 75, wherein the program step processing said received sample list is further comprised of at least one member of the collection comprising the program steps of:

processing said first received sample list by using said truncated pseudo-inverse B1 on at least some of said first received samples to create a first received signal parameter list containing at least one first received signal parameter; and processing said second received sample list by using said truncated pseudo-inverse B1 on at least some of said second received samples to create a second received signal parameter list containing at least one second received signal parameter.

77. The system of claim 68, wherein the program step determining said first communications service availability is further comprised of the program steps of:

detecting system communication based upon said third received signal parameter list to create a first system channel detection; and generating said first communications service determination based upon said first system channel detection.

78. The system of claim 68, wherein the program step determining said second communications service availability is further comprised of the program steps of:

estimating a first energy term based upon said fourth received signal parameter list and a second energy term based upon said fourth received signal parameter list; and generating said second communications service determination based upon said first energy estimate exceeding said second energy estimate multiplied by a threshold value.

79. The system of claim 78, wherein said second communications service determination includes a Clear Channel Access determination.

80. The system of claim 78, wherein at least one member of the linear transform collection includes a member of the collection comprising an FFT and an IFFT.

81. The system of claim 80, wherein at least one member of said linear transform collection is said IFFT of 64 points as specified in IEEE 802.11a; and wherein said truncated pseudo-inverse using said member provides at least an approximation of the 52 active frequency bins of the IEEE 802.11a physical layer during data transmission.

82. The system of claim 81, further comprising the program step of:

processing said received sample list by using a fifth truncated pseudo-inverse B5 to at least some of said received samples to create a second received signal parameter list containing at least one second received signal parameter.

83. The system of claim 82, wherein said fifth truncated pseudo-inverse B5 provides at least an approximation of the 12 active frequency bins of the IEEE 802.11a physical layer during header transmission.

84. The system of claim 68, wherein said sample list is further based upon a transported version of a baseband signal progression generated using at least part of at least one member of said linear transform collection.

85. The system of claim 84, wherein said linear transform collection further comprises at least one encoding linear transform; and wherein said baseband signal progression is generated as a signal progression using at least part of at least one member of said linear transform collection.

86. The system of claim 85, wherein at least one of said encoding transforms is approximately similar to a Hadamard transform.

87. The system of claim 86, wherein at least one of said encoding transforms is further approximately similar to a Walsh-Hadamard transform.

88. The system of claim 85, wherein at least one of said truncating pseudo-inverses approximates a pseudo-inverse of said at least part of linear transform A1 applied to said at least part of said encoding transforms.

89. The system of claim 88, wherein at least one of said encoding linear transforms provides a scattering transform applied to a time progression generated by using at least part of a spreading linear transform.

90. The system of claim 89, wherein at least one of said truncating pseudo-inverses approximates a pseudo-inverse of said at least part of scattering transform applied to said spreading transform.

91. The system of claim 68, wherein said linear transform A1 is determined by at least one physical transport layer across which said sample list is transported.

92. A method of determining availability of a first communications service based upon a third truncated pseudo-inverse B3 and of a second communications service based upon a fourth truncated pseudo-inverse B4 from a sample list of at least two digitized samples based upon at least one electromagnetic receptor, comprising the steps of:

receiving said sample list based upon said electromagnetic receptor to create a received sample list containing at least two received samples; and processing said second received sample list by using said third truncated pseudo-inverse B3 on at least some of said received samples to create a third received signal parameter list containing at least one third received signal parameter;

processing said second received sample list by using said fourth truncated pseudo-inverse B3 on at least some of said received samples to create a fourth received signal parameter list containing at least one fourth received signal parameter;

determining said first communications service availability based upon said third received signal parameter list to create a first communication service determination; and determining said second communications service availability based upon said fourth received signal parameter list to create a second communication service determination;

wherein a truncated pseudo-inverse B3 is based upon a linear transform A1;

wherein said fourth truncated pseudo-inverse B4 is based upon a linear transform A2;

wherein said sample list is based upon a transported version of a signal progression generated using at least part of at least one member of a linear transform collection comprising said linear transform A1 and said linear transform A2;

wherein said truncated pseudo-inverse B3 of said linear transform A3 is based upon a pseudo-inverse of A3 belonging to at least one member of the pseudo-inverse type collection comprising A3{1}, A3{2}, A3{3}, A3{4}Drazin inverse of A3, and a Moore-Penrose inverse A3{1,2,3,4}; and wherein said truncated pseudo-inverse B4 of said linear transform A4 is based upon a pseudo-inverse of A4 belonging to at least one member of the pseudo-inverse type collection comprising A4{1}, A4{2}, A4{3}, A4{4}, a Drazin inverse of A4, and a Moore-Penrose inverse A4{1,2,3,4}.

93. The method of claim 92, wherein said electromagnetic receptor includes at least one antenna element; and wherein said sample list based upon said electromagnetic receptor is further derived from an electromagnetic field proximate with said antenna element.

94. The method of claim 93, wherein said electromagnetic receptor includes at least two antenna elements; and wherein said sample list based upon said electromagnetic receptor is further derived from said electromagnetic fields proximate with said antenna elements.

95. The method of claim 92, wherein said electromagnetic receptor includes at least one semiconductor receptor element; and wherein said sample list based upon said electromagnetic receptor is further derived from an electromagnetic field based upon the bulk transport properties of said semiconductor receptor element.

96. The method of claim 95, wherein said electromagnetic receptor further includes at least two semiconductor receptor elements; and wherein said sample list based upon said electromagnetic receptor is further derived from an electromagnetic field based upon the bulk transport properties of said semiconductor receptor elements.

97. The method of claim 92, wherein said electromagnetic receptor is comprised of a first electromagnetic receptor and a second electromagnetic receptor.

98. The method of claim 97, wherein the step receiving said sample list based upon said electromagnetic receptor is further comprised of at least one of the collection comprising the steps of:

receiving a first sample list based upon said first electromagnetic receptor to create said received sample list containing at least two received samples; and receiving a second sample list based upon said second electromagnetic receptor to create said received sample list containing at least two received samples.

99. The method of claim 98, wherein the step receiving said first sample list based upon said first electromagnetic receptor is further comprised of the step of:

receiving a first sample list based upon said first electromagnetic receptor to create a first received sample list containing at least two received first samples; and wherein the step receiving said second sample list based upon said second electromagnetic receptor is further comprised of the step of:

receiving a second sample list based upon said second electromagnetic receptor to create a second received sample list containing at least two received second samples.

100. The method of claim 99,
wherein the step processing said received sample list is further comprised of at least one member of the collection comprising the steps of:
processing said first received sample list by using said truncated pseudo-inverse B1 on at least some of said first received samples to create a first received signal parameter list containing at least one first received signal parameter; and
processing said second received sample list by using said truncated pseudo-inverse B1 on at least some of said second received samples to create a second received signal parameter list containing at least one second received signal parameter.

101. The method of claim 92,
wherein the step determining said first communications service availability is further comprised of the steps of:
detecting system communication based upon said third received signal parameter list to create a first system channel detection; and
generating said first communications service determination based upon said first system channel detection.

102. The method of claim 92,
wherein the step determining said second communications service availability is further comprised of the steps of:
estimating a first energy term based upon said fourth received signal parameter list and a second energy term based upon said fourth received signal parameter list; and
generating said second communications service determination based upon said first energy estimate exceeding said second energy estimate multiplied by a threshold value.

103. The method of claim 102,
wherein said second communications service determination includes a Clear Channel Access determination.

104. The method of claim 102,
wherein at least one member of the linear transform collection includes a member of the collection comprising an FFT and an IFFT.

105. The method of claim 104,
wherein at least one member of said linear transform collection is said IFFT of 64 points as specified in IEEE 802.11a; and
wherein said truncated pseudo-inverse using said member provides at least an approximation of the 52 active frequency bins of the IEEE 802.11a physical layer during data transmission.

106. The method of claim 105, further comprising the step of:
processing said received sample list by using a fifth truncated pseudo-inverse B5 to at least some of said received samples to create a second received signal parameter list containing at least one second received signal parameter.

107. The method of claim 106,
wherein said fifth truncated pseudo-inverse B5 provides at least an approximation of the 12 active frequency bins of the IEEE 802.11a physical layer during header transmission.

108. The method of claim 92,
wherein said sample list is further based upon a transported version of a baseband signal progression generated using at least part of at least one member of said linear transform collection.

109. The method of claim 108,
wherein said linear transform collection further comprises at least one encoding linear transform; and
wherein said baseband signal progression is generated as a signal progression using at least part of at least one member of said linear transform collection.

110. The method of claim 109,
wherein at least one of said encoding transforms is approximately similar to a Hadamard transform.

111. The method of claim 110,
wherein at least one of said encoding transforms is further approximately similar to a Walsh-Hadamard transform.

112. The method of claim 109,
wherein at least one of said truncating pseudo-inverses approximates a pseudo-inverse of said at least part of linear transform A1 applied to said at least part of said encoding transforms.

113. The method of claim 112,
wherein at least one of said encoding linear transforms provides a scattering transform applied to a time progression generated by using at least part of a spreading linear transform.

114. The method of claim 113,
wherein at least one of said truncating pseudo-inverses approximates a pseudo-inverse of said at least part of scattering transform applied to said spreading transform.

115. A program system implementing the method of claim 92,
wherein said program system controlling reception of communications encoded as a time progression using said linear transformation A1 through the execution of program steps implementing at least the steps of the method,
wherein said program system is comprised of said program steps residing in memory accessibly coupled to at least one processing engine receptively coupled to said electromagnetic receptors to provide said digitized samples.

116. A system determining availability of a first communications service based upon a third truncated pseudo-inverse B3 and of a second communications service based upon a fourth truncated pseudo-inverse B4 from a sample list of at least two digitized samples based upon at least one electromagnetic receptor implementing the method of claim 92, comprising:
means for receiving said sample list based upon said electromagnetic receptor to create a received sample list containing at least two received samples; and
means for processing said second received sample list by using said third truncated pseudo-inverse B3 on at least some of said received samples to create a third received signal parameter list containing at least one third received signal parameter; and
means for processing said second received sample list by using said fourth truncated pseudo-inverse B3 on at least some of said received samples to create a fourth received signal parameter list containing at least one fourth received signal parameter;
means for determining said first communications service availability based upon said third received signal parameter list to create a first communication service determination; and means for determining said second communications service availability based upon said fourth received signal parameter list to create a second communication service determination.

wherein a truncated pseudo-inverse B3 is based upon a linear transform A1; and wherein said fourth truncated pseudo-inverse B4 is based upon a linear transform A2;

wherein said sample list is based upon a transported version of a signal progression generated using at least part of at least one member of a linear transform collection comprising said linear transform A1 and said linear transform A2.

117. The system of claim 116, wherein said means for receiving said sample list based upon said electromagnetic receptor to create a received sample list containing at least two received samples, is further comprised of:

a finite state machine controlling a buffer memory containing at least two memory locations through the operation of at least two finite states of a finite states of said finite state machine; and said buffer memory receptively coupled to said electromagnetic receptor;

wherein said finite state machine operating through said at least two finite states causes said buffer memory to contain said received samples contained in said received sample list.

118. The system of claim 116, wherein said means for processing said received sample list by using said truncated pseudo-inverse B3 is further comprised of:

an arithmetic circuit implementing said truncated pseudo-inverse B1 acting on at least some of said received samples to create said received signal parameter list containing said at least one received signal parameter;

wherein said means for receiving said received sample list provides said received samples to said arithmetic circuit.

119. The system of claim 118, wherein said arithmetic circuit implementing said truncated pseudo-inverse B3 is controlled by a second finite state machine.

120. The system of claim 119, wherein said second finite state machine includes a state register containing a program counter.

121. The system of claim 118, wherein said arithmetic circuit implementing said truncated pseudo-inverse B3 is controlled strictly by input-output stimulus.

122. A system processing a sample list of at least two digitized samples based upon at least one electromagnetic receptor using a truncated pseudo-inverse B1 of a linear transform A1, comprising:

at least one processing engine receptively coupled to said electromagnetic receptors to provide said digitized samples controlled by a program system comprising program steps residing in memory accessibly coupled to said processing engine;

wherein said program system comprising the program steps of:

receiving said sample list based upon said electromagnetic receptor to create a received sample list containing at least two received samples; and processing said received sample list by using said truncated pseudo-inverse B1 on at least some of said received samples to create a received signal parameter list containing at least one received signal parameter;

wherein said sample list is based upon a transported version of a signal progression generated using at least part of linear transform A1;

wherein said linear transform A1 includes an IFFT of 64 points as specified in IEEE 802.11a; and wherein said truncated pseudo-inverse B1 provides at least an approximation of the 52 active frequency bins of the IEEE 802.11a physical layer during data transmission.

123. The system of claim 122, wherein said electromagnetic receptor includes at least one antenna element; and wherein said sample list based upon said electromagnetic receptor is further derived from an electromagnetic field proximate with said antenna element.

124. The system of claim 123, wherein said electromagnetic receptor includes at least two antenna elements; and wherein said sample list based upon said electromagnetic receptor is further derived from said electromagnetic fields proximate with said antenna elements.

125. The system of claim 122, wherein said electromagnetic receptor includes at least one semiconductor receptor element; and wherein said sample list based upon said electromagnetic receptor is further derived from an electromagnetic field based upon the bulk transport properties of said semiconductor receptor element.

126. The system of claim 125, wherein said electromagnetic receptor further includes at least two semiconductor receptor elements; and wherein said sample list based upon said electromagnetic receptor is further derived from an electromagnetic field based upon the bulk transport properties of said semiconductor receptor elements.

127. The system of claim 122, wherein said electromagnetic receptor is comprised of a first electromagnetic receptor and a second electromagnetic receptor.

128. The system of claim 127, wherein the program step receiving said sample list based upon said electromagnetic receptor is further comprised of at least one of the collection comprising the program steps of:

receiving a first sample list based upon said first electromagnetic receptor to create said received sample list containing at least two received samples; and receiving a second sample list based upon said second electromagnetic receptor to create said received sample list containing at least two received samples.

129. The system of claim 128, wherein the program step receiving said first sample list based upon said first electromagnetic receptor is further comprised of the program step of:

receiving a first sample list based upon said first electromagnetic receptor to create a first received sample list containing at least two received first samples; and wherein the program step receiving said second sample list based upon said second electromagnetic receptor is further comprised of the program step of:

receiving a second sample list based upon said second electromagnetic receptor to create a second received sample list containing at least two received second samples.

130. The system of claim 129,
wherein the program step processing said received sample list is further comprised of at least one member of the collection comprising the program steps of:
processing said first received sample list by using said truncated pseudo-inverse B1 on at least some of said first received samples to create a first received signal parameter list containing at least one first received signal parameter; and
processing said second received sample list by using said truncated pseudo-inverse B1 on at least some of said second received samples to create a second received signal parameter list containing at least one second received signal parameter.

131. The system of claim 129,
wherein the program step processing said received sample list is further comprised of the program step of:
processing said second received sample list by using a second truncated pseudo-inverse B2 on at least some of said second received samples to create a second received signal parameter list containing at least one second received signal parameter.

132. The system of claim 122,
wherein said truncated pseudo-inverse B1 contains at least a third truncated pseudo-inverse B3 and a fourth truncated pseudo-inverse B4;
wherein the program step processing said received sample list further comprises the program steps of:
processing said second received sample list by using said third truncated pseudo-inverse B3 on at least some of said received samples to create a third received signal parameter list containing at least one third received signal parameter; and
processing said second received sample list by using said fourth truncated pseudo-inverse B3 on at least some of said received samples to create a fourth received signal parameter list containing at least one fourth received signal parameter.

133. A system of determining availability of a first communications service based upon said third truncated pseudo-inverse B3 and of a second communications service based upon said fourth truncated pseudo-inverse B4 comprising:
said system of claim 132;
wherein said program system is further comprised of the program steps of:
determining said first communications service availability based upon said third received signal parameter list to create a first communication service determination; and
determining said second communications service availability based upon said fourth received signal parameter list to create a second communication service determination.

134. The system of claim 133,
wherein the program step determining said first communications service availability is further comprised of the program steps of:
detecting system communication based upon said third received signal parameter list to create a first system channel detection; and
generating said first communications service determination based upon said first system channel detection.

135. The system of claim 133,
wherein the program step determining said second communications service availability is further comprised of the program steps of:
estimating a first energy term based upon said fourth received signal parameter list and a second energy term based upon said fourth received signal parameter list; and
generating said second communications service determination based upon said first energy estimate exceeding said second energy estimate multiplied by a threshold value.

136. The system of claim 135,
wherein said second communications service determination includes a Clear Channel Access determination.

137. The system of claim 122,
wherein said program systems is further comprised of the program step of:
processing said received sample list by using a fifth truncated pseudo-inverse B5 to at least some of said received samples to create a second received signal parameter list containing at least one second received signal parameter.

138. The system of claim 137,
wherein said fifth truncated pseudo-inverse B5 provides at least an approximation of the 12 active frequency bins of the IEEE 802.11a physical layer during header transmission.

139. The system of claim 122,
wherein said sample list is further based upon a transported version of a baseband signal progression generated using at least part of linear transform A1.

140. The system of claim 139,
wherein said baseband signal progression is generated as a signal progression using at least part of a second linear transform A2.

141. The system of claim 140,
wherein said second linear transform A2 is approximately similar to a Hadamard transform.

142. The system of claim 141,
wherein said second linear transform A2 is further approximately similar to a Walsh-Hadamard transform.

143. The system of claim 140,
wherein said truncating pseudo-inverse B1 approximates a pseudo-inverse of said at least part of linear transform A1 applied to said at least part of a second linear transform A2.

144. The system of claim 143,
wherein using said at least part of said second linear transform A2 provides a scattering transform applied to a time progression generated by using at least part of a spreading linear transform A3.

145. The system of claim 144,
wherein said truncating pseudo-inverse B1 approximates a pseudo-inverse of said at least part of linear transform A1 applied to said at least part of said second linear transform A2 applied to said at least part of said spreading linear transform A3.

146. A method of processing a sample list of at least two digitized samples based upon at least one electromagnetic receptor using a truncated pseudo-inverse B1 of a linear transform A1, comprising the steps of:
receiving said sample list based upon said electromagnetic receptor to create a received sample list containing at least two received samples; and processing said received sample list by using said truncated pseudo-inverse B1 on at least some of said received samples to create a received signal parameter list containing at least one received signal parameter;

wherein said sample list is based upon a transported version of a signal progression generated using at least part of linear transform A1;

wherein said linear transform A1 includes an IFFT of 64 points as specified in IEEE 802.11a; and wherein said truncated pseudo-inverse B1 provides at least an approximation of the 52 active frequency bins of the IEEE 802.11a physical layer during data transmission; and wherein said truncated pseudo-inverse B1 of said linear transform A1 is based upon a pseudo-inverse of A1 belonging to at least one member of the pseudo-inverse type collection comprising A1{1}, A1{2}, A1{3}, A1{4}, a Drazin inverse of A1, and a Moore-Penrose inverse A1{1,2,3,4}.

147. The method of claim 146, wherein said electromagnetic receptor includes at least one antenna element; and wherein said sample list based upon said electromagnetic receptor is further derived from an electromagnetic field proximate with said antenna element.

148. The method of claim 147, wherein said electromagnetic receptor includes at least two antenna elements; and wherein said sample list based upon said electromagnetic receptor is further derived from said electromagnetic fields proximate with said antenna elements.

149. The method of claim 146, wherein said electromagnetic receptor includes at least one semiconductor receptor element; and wherein said sample list based upon said electromagnetic receptor is further derived from an electromagnetic field based upon the bulk transport properties of said semiconductor receptor element.

150. The method of claim 149, wherein said electromagnetic receptor further includes at least two semiconductor receptor elements; and wherein said sample list based upon said electromagnetic receptor is further derived from an electromagnetic field based upon the bulk transport properties of said semiconductor receptor elements.

151. The method of claim 146, wherein said electromagnetic receptor is comprised of a first electromagnetic receptor and a second electromagnetic receptor.

152. The method of claim 151, wherein the step receiving said sample list based upon said electromagnetic receptor is further comprised of at least one of the collection comprising the steps of:

receiving a first sample list based upon said first electromagnetic receptor to create said received sample list containing at least two received samples; and receiving a second sample list based upon said second electromagnetic receptor to create said received sample list containing at least two received samples.

153. The method of claim 152, wherein the step receiving said first sample list based upon said first electromagnetic receptor is further comprised of the step of:

receiving a first sample list based upon said first electromagnetic receptor to create a first received sample list containing at least two received first samples; and wherein the step receiving said second sample list based upon said second electromagnetic receptor is further comprised of the step of:

receiving a second sample list based upon said second electromagnetic receptor to create a second received sample list containing at least two received second samples.

154. The method of claim 153, wherein the step processing said received sample list is further comprised of at least one member of the collection comprising the steps of:

processing said first received sample list by using said truncated pseudo-inverse B1 on at least some of said first received samples to create a first received signal parameter list containing at least one first received signal parameter; and processing said second received sample list by using said truncated pseudo-inverse B1 on at least some of said second received samples to create a second received signal parameter list containing at least one second received signal parameter.

155. The method of claim 153, wherein the step processing said received sample list is further comprised of the step of:

processing said second received sample list by using a second truncated pseudo-inverse B2 on at least some of said second received samples to create a second received signal parameter list containing at least one second received signal parameter.

156. The method of claim 146, wherein said truncated pseudo-inverse B1 contains at least a third truncated pseudo-inverse B3 and a fourth truncated pseudo-inverse B4;

wherein the step processing said received sample list further comprises the steps of:

processing said second received sample list by using said third truncated pseudo-inverse B3 on at least some of said received samples to create a third received signal parameter list containing at least one third received signal parameter; and processing said second received sample list by using said fourth truncated pseudo-inverse B3 on at least some of said received samples to create a fourth received signal parameter list containing at least one fourth received signal parameter.

157. A method of determining availability of a first communications service based upon said third truncated pseudo-inverse B3 and of a second communications service based upon said fourth truncated pseudo-inverse B4 using the method of claim 156, further comprising the steps of:

determining said first communications service availability based upon said third received signal parameter list to create a first communication service determination; and determining said second communications service availability based upon said fourth received signal parameter list to create a second communication service determination.

158. The method of claim 157, wherein the step determining said first communications service availability is further comprised of the steps of:

detecting system communication based upon said third received signal parameter list to create a first system channel detection; and generating said first communications service determination based upon said first system channel detection.

159. The method of claim 157,
wherein the step determining said second communications service availability is further comprised of the steps of:
estimating a first energy term based upon said fourth received signal parameter list and a second energy term based upon said fourth received signal parameter list; and
generating said second communications service determination based upon said first energy estimate exceeding said second energy estimate multiplied by a threshold value.

160. The method of claim 159,
wherein said second communications service determination includes a Clear Channel Access determination.

161. The method of claim 146, further comprising the step of:
processing said received sample list by using a fifth truncated pseudo-inverse B5 to at least some of said received samples to create a second received signal parameter list containing at least one second received signal parameter.

162. The method of claim 161,
wherein said fifth truncated pseudo-inverse B5 provides at least an approximation of the 12 active frequency bins of the IEEE 802.11a physical layer during header transmission.

163. The method of claim 146,
wherein said sample list is further based upon a transported version of a baseband signal progression generated using at least part of linear transform A1.

164. The method of claim 163,
wherein said baseband signal progression is generated as a signal progression using at least part of a second linear transform A2.

165. The method of claim 164,
wherein said second linear transform A2 is approximately similar to a Hadamard transform.

166. The method of claim 165,
wherein said second linear transform A2 is further approximately similar to a Walsh-Hadamard transform.

167. The method of claim 164,
wherein said truncating pseudo-inverse B1 approximates a pseudo-inverse of said at least part of linear transform A1 applied to said at least part of a second linear transform A2.

168. The method of claim 167,
wherein using said at least part of said second linear transform A2 provides a scattering transform applied to a time progression generated by using at least part of a spreading linear transform A3.

169. The method of claim 168,
wherein said truncating pseudo-inverse B1 approximates a pseudo-inverse of said at least part of linear transform A1 applied to said at least part of said second linear transform A2 applied to said at least part of said spreading linear transform A3.

170. A program system implementing the method of claim 146,
wherein said program system controlling reception of communications encoded as a time progression using said linear transformation A1 through the execution of program steps implementing at least the steps of the method,
wherein said program system is comprised of said program steps residing in memory accessibly coupled to at least one processing engine receptively coupled to said electromagnetic receptors to provide said digitized samples.

171. A system for processing a sample list of at least two digitized samples based upon at least one electromagnetic receptor using a truncated pseudo-inverse B1 of a linear transform A1 implementing the method of claim 146, comprising:
means for receiving said sample list based upon said electromagnetic receptor to create a received sample list containing at least two received samples; and
means for processing said received sample list by using said truncated pseudo-inverse B1 to at least some of said received samples to create a received signal parameter list containing at least one received signal parameter;
wherein said sample list is based upon a transported version of a signal progression generated using at least part of linear transform A1.

172. The system of claim 171,
wherein said means for receiving said sample list based upon said electromagnetic receptor to create a received sample list containing at least two received samples, is further comprised of:
a finite state machine controlling a buffer memory containing at least two memory locations through the operation of at least two finite states of a finite states of said finite state machine; and
said buffer memory receptively coupled to said electromagnetic receptor;
wherein said finite state machine operating through said at least two finite states causes said buffer memory to contain said received samples contained in said received sample list.

173. The system of claim 171,
wherein said means for processing said received sample list by using said truncated pseudo-inverse B1 is further comprised of:
an arithmetic circuit implementing said truncated pseudo-inverse B1 acting on at least some of said received samples to create said received signal parameter list containing said at least one received signal parameter;
wherein said means for receiving said received sample list provides said received samples to said arithmetic circuit.

174. The system of claim 173,
wherein said arithmetic circuit implementing said truncated pseudo-inverse B1 is controlled by a second finite state machine.

175. The system of claim 174,
wherein said second finite state machine includes a state register containing a program counter.

176. The system of claim 173,
wherein said arithmetic circuit implementing said truncated pseudo-inverse B1 is controlled strictly by input-output stimulus.

* * * * *